(12) United States Patent
Shimizu et al.

(10) Patent No.: US 11,012,609 B2
(45) Date of Patent: May 18, 2021

(54) IMAGE PICKUP APPARATUS AND ITS CONTROL METHOD, AND STORAGE MEDIUM

(71) Applicant: CANON KABUSHIKI KAISHA, Tokyo (JP)

(72) Inventors: Yusuke Shimizu, Kawasaki (JP); Miyako Shibutani, Tokyo (JP); Takumi Takehara, Tokyo (JP); Satoshi Kimoto, Saitama (JP); Tomohiro Tateishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/913,681

(22) Filed: Jun. 26, 2020

(65) Prior Publication Data

US 2020/0412969 A1 Dec. 31, 2020

(30) Foreign Application Priority Data

Jun. 28, 2019 (JP) .............................. JP2019-120685
Mar. 30, 2020 (JP) .............................. JP2020-060241
Jun. 4, 2020 (JP) .............................. JP2020-097555

(51) Int. Cl.
*H04N 5/232* (2006.01)

(52) U.S. Cl.
CPC ... *H04N 5/232127* (2018.08); *H04N 5/23287* (2013.01)

(58) Field of Classification Search
CPC .................. H04N 5/232127; H04N 5/23287

USPC ..................................................... 348/208.11
See application file for complete search history.

(56) References Cited

U.S. PATENT DOCUMENTS

| 9,172,523 | B2 * | 10/2015 | Okada | H04N 5/23209 |
| 9,900,493 | B2 * | 2/2018 | Akaguma | H04N 9/04557 |
| 10,033,919 | B2 * | 7/2018 | Akaguma | H04N 5/232122 |
| 10,834,309 | B2 * | 11/2020 | Sugitani | H04N 5/232121 |
| 2013/0182171 | A1 * | 7/2013 | Kawanishi | G03B 3/10 |
| | | | | 348/345 |
| 2013/0321692 | A1 * | 12/2013 | Kawanishi | H04N 5/23212 |
| | | | | 348/345 |

(Continued)

FOREIGN PATENT DOCUMENTS

JP 04-133016 A 5/1992

*Primary Examiner* — Pritham D Prabhakher
(74) *Attorney, Agent, or Firm* — Cowan, Liebowitz & Calman. P.C.

(57) ABSTRACT

An image pickup apparatus executes a focus detecting task configured to detect a defocus amount by a signal acquired from an image sensor, a predicting task configured to calculate information corresponding to a predicted image plane position by a prediction calculation using the defocus amount detected a plurality of times and position data of a focusing element and time data when the defocus amount is detected, and a controlling task configured to calculate a driving amount of the focusing element using the information corresponding to the predicted image plane position, to calculate a driving velocity for the focusing element according to the driving amount, and to provide a control such that the focusing element is driven at the driving velocity, wherein the controlling task calculates the driving velocity in order that an image plane position of the imaging optical system approaches the predicted image plane position.

37 Claims, 15 Drawing Sheets

(56) References Cited

U.S. PATENT DOCUMENTS

| | | | |
|---|---|---|---|
| 2015/0085177 A1* | 3/2015 | Okada | H04N 5/23296 |
| | | | 348/345 |
| 2016/0295099 A1* | 10/2016 | Kasamatsu | H04N 5/2257 |
| 2017/0094151 A1* | 3/2017 | Akaguma | G06K 9/6215 |
| 2017/0237895 A1* | 8/2017 | Sakurabu | H04N 9/04557 |
| | | | 348/353 |
| 2017/0244889 A1* | 8/2017 | Sakurabu | H04N 9/045 |
| 2018/0027172 A1* | 1/2018 | Akaguma | H04N 5/36961 |
| | | | 348/345 |
| 2019/0149741 A1* | 5/2019 | Sugitani | H04N 5/232121 |
| | | | 348/349 |
| 2020/0228719 A1* | 7/2020 | Kimoto | H04N 5/23212 |

\* cited by examiner

IMAGE PICKUP APPARATUS AND ITS CONTROL METHOD, AND STORAGE MEDIUM

BACKGROUND OF THE INVENTION

Field of the Invention

The present invention relates an image pickup apparatus that controls focusing.

Description of the Related Art

Some image pickup apparatuses, such as digital cameras, are configured to perform autofocus (AF) by an imaging plane phase difference detection method using an output signal from an image sensor configured to capture an object image. Japanese Patent Laid-Open No. ("JP") H4-133016 discloses an image pickup apparatus that performs, when imaging a moving object, the AF while following the object by calculating a driving amount of a focus lens. The driving amount of the focus lens is acquired by calculating a moving velocity (shifting speed of image plane) of an image plane position on which an object image is formed, and by adding a correction amount correlated with the shifting speed of the image plane to a latest defocus amount.

However, the image pickup apparatus disclosed in JP H4-133016 does not control a driving velocity of the focus lens. Thus, the image pickup apparatus may not be able to control focusing well when the moving velocity of the object changes.

SUMMARY OF THE INVENTION

The present invention provides an image pickup apparatus that can control focusing well even when a moving velocity of an object varies.

An image pickup apparatus as one aspect of the present invention includes at least one processor or circuit configured to execute a plurality of tasks of a focus detecting task configured to detect a defocus amount by using a signal acquired from an image sensor configured to capture an object image formed by an imaging optical system, a predicting task configured to calculate information corresponding to a predicted image plane position, which is an image plane position of the object image at a previous time, by performing a prediction calculation using the defocus amount detected a plurality of times and position data of a focusing element and time data when the defocus amount is detected, and a controlling task configured to calculate a driving amount of the focusing element using the information corresponding to the predicted image plane position, to calculate a driving velocity for the focusing element according to the driving amount, and to provide a control such that the focusing element is driven at the driving velocity. The controlling task calculates the driving velocity in order that an image plane position of the imaging optical system approaches the predicted image plane position.

A control method for the above image pickup apparatus and a storage medium storing a computer program that enables a computer to execute the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
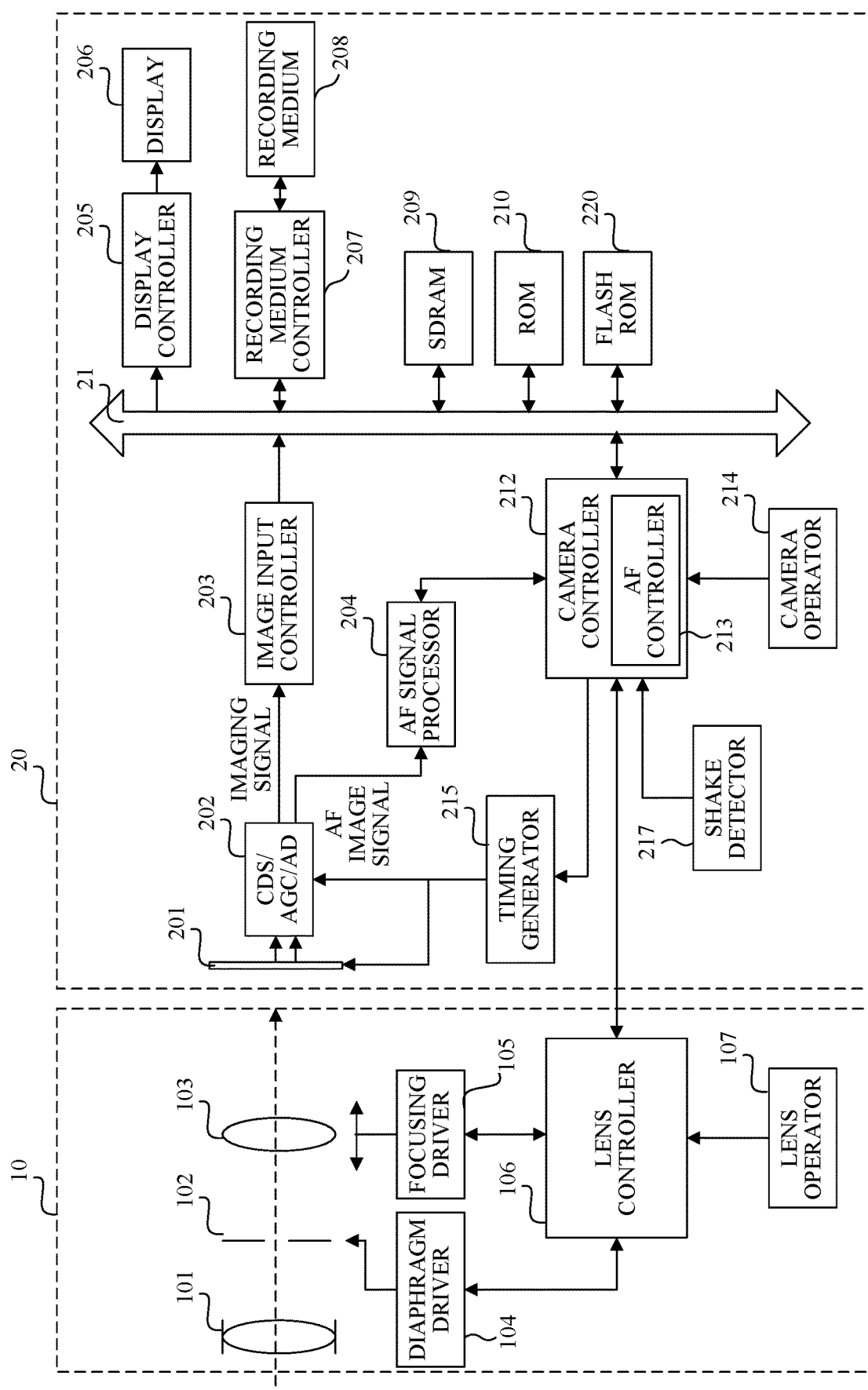
FIG. 1 is a block diagram illustrating a configuration of a camera and an interchangeable lens according to a first embodiment of the present invention.

FIG. 1 illustrates a configuration of a lens interchangeable camera system including a camera body (hereinafter, simply referred to as a camera) 20 and an interchangeable lens 10, as the image pickup apparatus of the first embodiment of the present invention. The interchangeable lens 10 is detachably attachable to the camera 20 via a mount portion.

The interchangeable lens 10 includes an imaging optical system having a fixed lens 101, a diaphragm 102 and a focus lens (focusing element) 103. The diaphragm 102 is driven by a diaphragm actuator included in a diaphragm driver 104, and is configured to adjust an amount of light passing through the imaging optical system by increasing or decreasing an aperture diameter. The focus lens 103 is driven in an optical axis direction by a focusing actuator included in a focusing driver 105, and is configured to adjust a focus.

A lens operator 107 includes various operating members operated by a user. A lens controller 106 is configured to perform control and processing according to the user operation via the lens operator 107. The lens controller 106 is configured to control the diaphragm driver 104 and the focusing driver 105, and to transmit information on the interchangeable lens 10 (lens information) to a camera controller 212, according to an instruction or information received from the camera controller 212, which will be described later, via an electrical contact (not illustrated) provided on the mount portion.

The camera 20 includes an image sensor 201, CDS/AGC/AD 202, image input controller 203, AF signal processor 204, display controller 205, display 206, recording medium controller 207, recording medium 208, SDRAM 209, ROM 210, flash ROM 220, camera controller 212 and camera operator 214.

The image sensor 201 is composed of a CCD sensor or CMOS sensor and configured to capture (photoelectrically convert) an object image formed by the imaging optical system, and to output an analog electric signal. The image sensor 201 is driven according to an imaging driving signal given from a timing generator 215 in accordance with the instruction from the camera controller 212.

Figure 2:
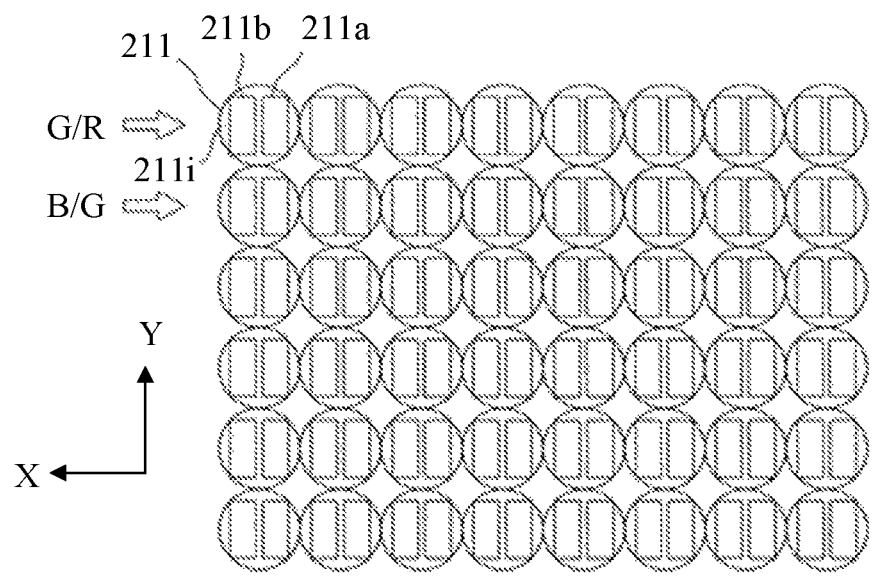
FIG. 2 is a diagram illustrating a pixel configuration for detecting a focus for an imaging plane phase difference detection method in the camera according to the first embodiment.

The image sensor 201 is configured such that each pixel has one microlens and two photoelectric converters (photodiodes) in order to perform the AF (imaging plane phase difference AF) by the imaging plane phase difference detection method. FIG. 2 illustrates a pixel array of the image sensor 201 including a range of vertical (Y direction) 6-pixel rows and horizontal (X direction) 8-pixel columns of the CMOS image sensor, viewed from an imaging optical system side. The image sensor 201 is provided with a Bayer array of color filters. In the image sensor 201, the pixels in odd rows are alternately provided with green (G) and red (R) color filters from left to right, and the pixels in even rows are alternately provided with blue (B) and green (G) color filters from left to right. In a pixel 211, a circle with a reference numeral 211i is an on-chip microlens (simply referred to as a microlens hereinafter), and two rectangles with reference numerals 211a and 211b disposed inside the microlens 211i are photoelectric converters, respectively.

The microlens 211i separates a light beam incident on each pixel into two. The two photoelectric converters 211a and 211b photoelectrically convert these two light beams, and two electric signals, an A signal and a B signal, are generated. By synthesizing each of the A and B signals acquired from the plurality of pixels, an A image signal and a B image signal (collectively referred to as a pair of AF image signals hereinafter) are acquired as two-(pair-)image signal for detecting the focus in the AF. An imaging signal for generating a captured image is acquired by synthesizing an (A+B) signal obtained by adding the A and B signals from each of the plurality of pixels. In each pixel, one of the A and B signals may be acquired by subtracting the other signal from the (A+B) signal.

The pair of the AF image signals and the imaging signal are read out from the image sensor 201, and are input to the CDS/AGC/AD converter 202. The CDS/AGC/AD converter 202 removes reset noise of the input signals by correlated double sampling, adjusts gain, and digitizes the signals. The CDS/AGC/AD converter 202 outputs the pair of the digitized AF image signals to the AF signal processor 204, and outputs the digitized imaging signal to the image input controller 203.

The image input controller 203 stores the digitized imaging signal on the SDRAM 209. The digitized imaging signal stored on the SDRAM 209 is transmitted to the display controller 205 via a bus 21. The display controller 205 makes the display 206 display an image corresponding to the digitized imaging signal. When a mode is set of recording the captured image, the recording medium controller 207 records the digitized imaging signal on the recording medium 208.

The ROM 210 stores a computer program executed by the camera controller 212 as a computer, data necessary for various controls, and the like. The flash ROM 220 stores various information relating to operation of the camera 20 such as information set by the user.

The object detector 216 performs face detection processing or the like on the digitized imaging signal read out from the image sensor 201, and detects information on a face area of the object and color information that is a feature of the object. The shake detector 217 detects a shake amount of the camera.

The AF signal processor 204 operates a correlation calculation on the A and B image signals as the pair of the digitized AF image signals, and acquires a phase difference (image shift amount) between the A and B image signals and reliability information (two-image matching level, contrast information, saturation information, damage information, etc.). The AF signal processor 204 outputs the calculated image shift amount and reliability information to the camera controller 212. According to the acquired image shift amount and reliability information, the camera controller 212 notifies the AF signal processor 204 of a change in a setting for calculating those. For example, the camera controller 212 sets wide the area for operating the correlation calculation when the image shift amount is large, or the camera controller 212 changes a type of a bandpass filter according to the contrast information.

The camera controller 212 is configured to control each block in the camera 20. The camera operator 214 is configured to control operation of the interchangeable lens 10 while communicating with the lens controller 106. An AF controller 213 is provided in the camera controller 212. The AF controller 213 is configured to control the AF (control focusing) using the image shift amount and the reliability information. A focus detecting unit is configured by the AF signal processor 204 and the AF controller 213.

Figure 4:
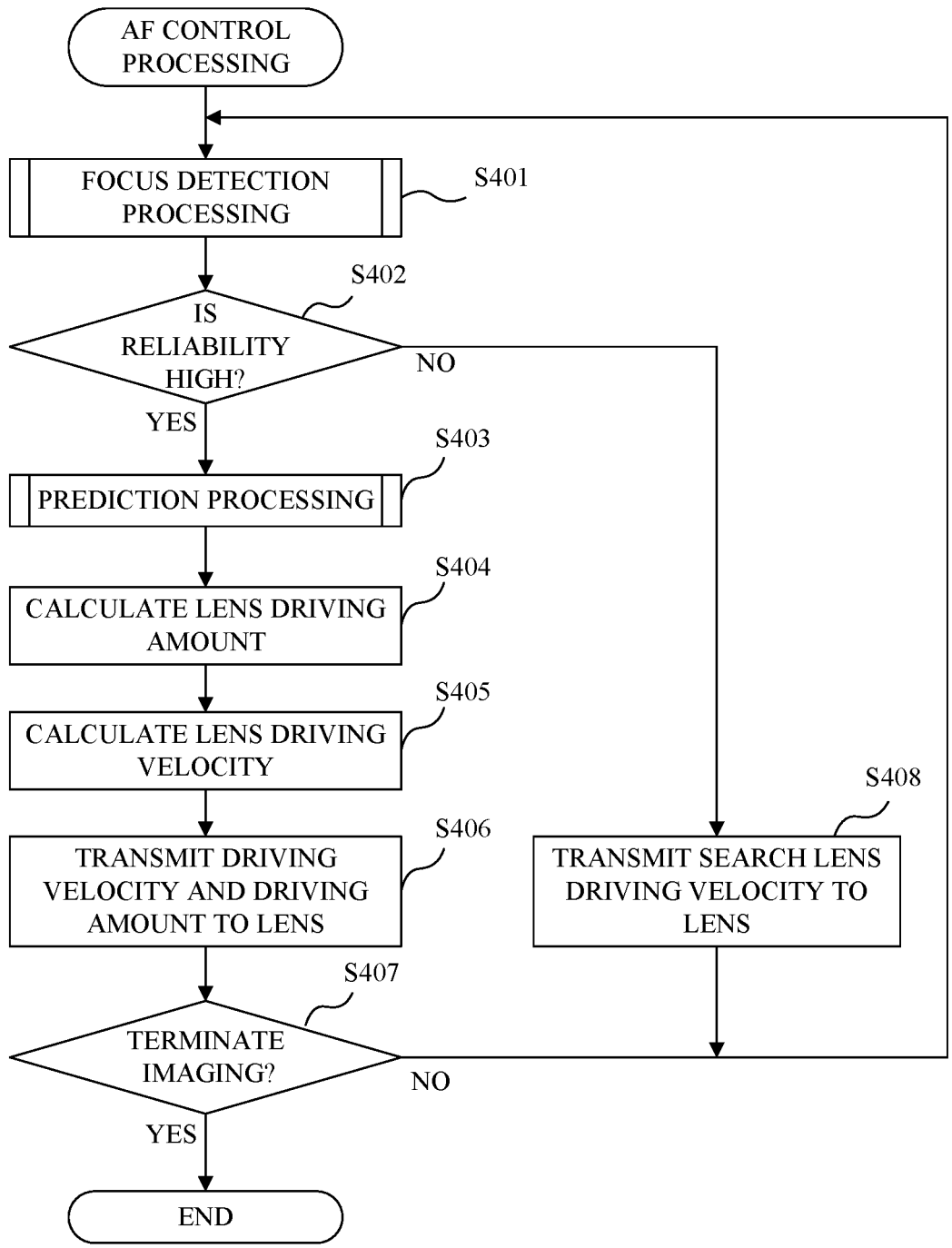
FIG. 4 is a flowchart describing AF processing according to the first embodiment.

The flowchart in FIG. 4 describes AF control processing (control method) executed by the camera controller 212 (AF controller 213) as a controlling unit and a predicting unit, according to a computer program. In the step S401, the camera controller 212 performs focus detection processing. Details will be described later of the focus detection processing. The image plane position is calculated based on the defocus amount detected in the focus detection and a position of the focus lens 103. A memory area in the SDRAM 209 stores the calculated image plane position and detection time of the defocus amount for each of a plurality of the past detection.

Next in the step S402, the camera controller 212 determines whether a reliability of the focus detection result is high, by using the reliability information acquired by the focus detection processing in the step S401. When the reliability is high, the camera controller 212 proceeds to the step S403. When the reliability is low, because the object is in a largely blurred state, and thus the camera controller 212 proceeds to the step S408.

Figure 5:
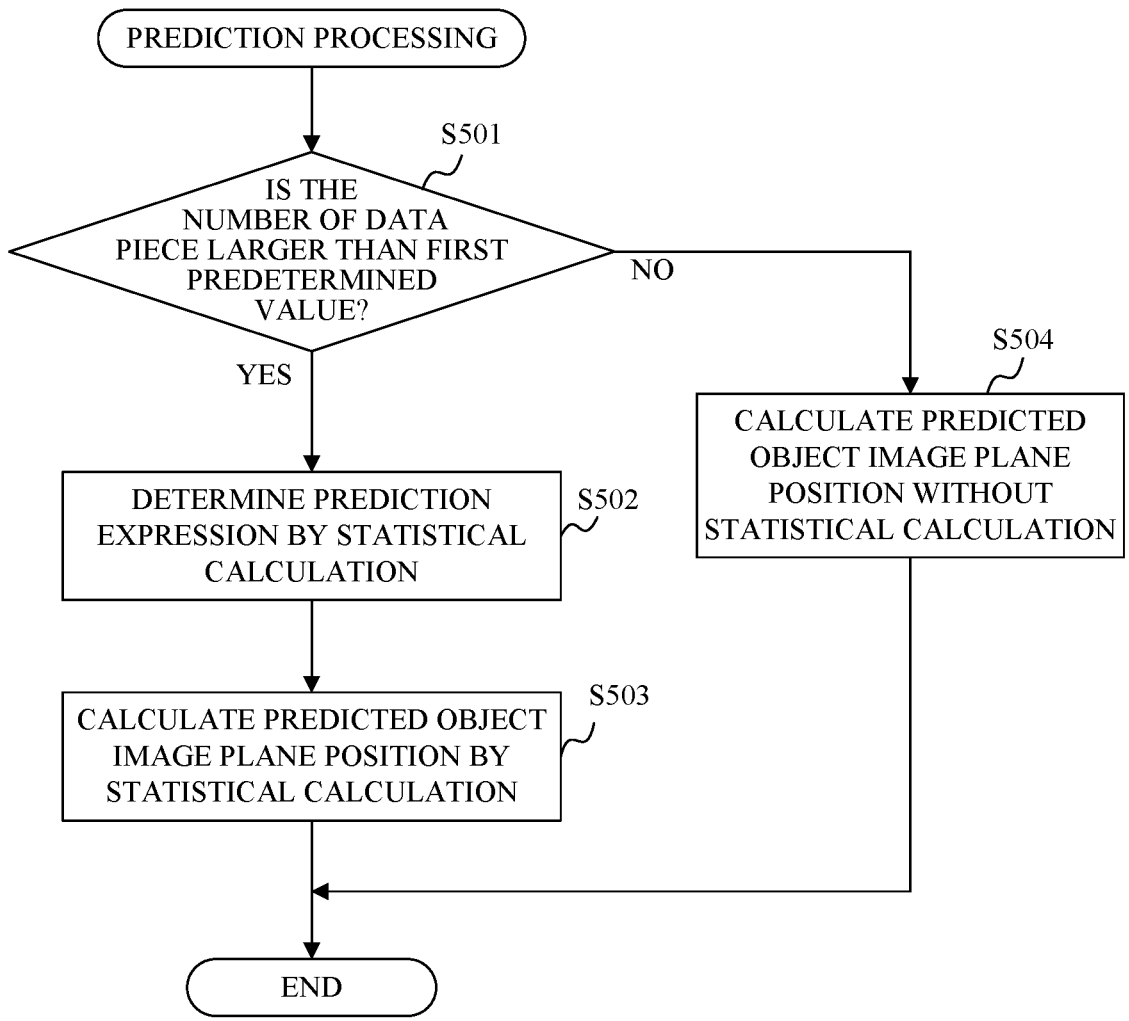
FIG. 5 is a flowchart describing prediction processing according to the first embodiment.

In the step S403, the camera controller 212 as a predicting unit calculates the image plane position (referred to as detected object image plane position hereinafter) where an in-focus object image forms, by using the defocus amount detected (calculated) in the focus detection processing in the step S401. The camera controller 212 performs prediction processing (prediction calculation) by using the calculated detected object image plane position. In the prediction processing, the camera controller 212 calculates a predicted object image plane position (predicted image plane position) as the object image plane position in the future (next time point). In the prediction processing, the camera controller 212 calculates the predicted object image plane position based on the past plurality of the detected object image plane positions and the time points when the defocus amounts are detected. This embodiment performs the prediction processing using statistical calculation as described in the flowchart in FIG. 5. The process of the present invention may be executed using the information on the focus lens position as the information corresponding to the image plane position, instead of the information on the image plane position.

First in the step S501, the camera controller 212 determines whether the number of data pieces is equal to or larger than the first predetermined value, the data piece indicating the detected object image plane position and the detection time of the defocus amount. When the number of the data pieces is smaller than the first predetermined value, it is impossible to perform the statistical calculation. When the camera controller 212 determines that the number of the data pieces is equal to or larger than the first predetermined value, the process proceeds to the step S402. When the camera controller 212 determines that the number of the data pieces is smaller than the first predetermined value, the process proceeds to the step S504.

In the step S502, the camera controller 212 calculates the prediction expression f(t) given by the expression (1), using the statistical calculation.

$$f(t) = \alpha + \beta t + \gamma tn \quad (1)$$

The expression (1) is assumed to be a linear regression model where an objective variable is f (t) representing the detected object image plane position, and explanatory variables are t and tn representing the defocus amount calculation. The camera controller 212 statistically determines each coefficient of $\alpha$, $\beta$, and $\gamma$ so as to best fits (matches) the prediction expression f (t) to the past plurality of pairs of the detected object image plane position and the detection time of the defocus amount, by a multiple regression analysis using the expression (1). The value of n in the expression (1) is calculated such that a prediction error becomes minimum when the prediction calculation is operated for a plurality of samples of typical object motion prediction imaging scene.

Next in the step S503, the camera controller 212 calculates the predicted object image plane position by using the prediction expression f (t) determined in the step S502 and the data (detected object image plane position and detection time of defocus amount), and the process proceeds to the step S404 in FIG. 4.

On the other hand, in the step S504, the camera controller 212 calculates the object image plane position from the calculated defocus amount without using the statistical calculation. The object image plane position here is the image plane position where the object is in-focus, calculated by the current focus lens position and defocus amount. That is, the object image plane position here is a position of a rear focus when the focus lens focuses on the object. The processing of the present invention may be executed by using the information on the focus lens position as the information corresponding to the image plane position, instead of the information of the image plane position.

Thereafter, the process proceeds to the step S404 in FIG. 4.

When a change velocity (shifting speed of the image plane) of the detected object image plane position is higher than a predetermined change velocity, the predicted object image plane position may be calculated based on the calculated defocus amount without using the statistical calculation. At the time of a magnification variation (zoom) of the imaging optical system, the predicted object image plane position may be calculated based on the calculated defocus amount instead of the statistical calculation.

In the step S404 in FIG. 4, the camera controller 212 calculates a difference between the predicted object image plane position calculated in the step S403 and the current image plane position of the imaging optical system (referred to as lens image plane position hereinafter), and calculates a lens driving amount (first driving amount: referred to as first lens driving amount hereinafter) as a driving amount of the focus lens 103 using the calculated difference.

Next in the step S405, the camera controller 212 calculates the driving velocity of the focus lens 103 (referred to as lens driving velocity hereinafter) by dividing the first lens driving amount calculated in the step S404 by time length for driving the focus lens 103, in order to drive the focus lens 103 and to align the lens image plane position with the predicted object image plane position, in other words, to bring them closer. In order to maintain a quality of the captured image during motion image capturing, the lens driving velocity may be calculated to be lower than that during still image capturing.

Next in the step S406, the camera controller 212 sets (selects) the lens driving amount to be transmitted to the lens controller 106 according to the lens driving velocity calculated in the step S405. In this embodiment, the lens driving amount transmitted to the lens controller 106 is variable according to the lens driving velocity. For example, when the lens driving velocity is higher than a predetermined driving velocity V1 in order to make the focus follow the object moving at a high velocity, the camera controller 212 sets a second lens driving amount which is larger than the first lens driving amount. On the other hand, when the lens driving velocity is lower than the predetermined driving velocity V1 or when the shifting speed of the image plane decreases, the camera controller 212 transmits the first lens driving amount to the lens controller 106 in order to prevent an over-response of the focusing control.

The camera controller 212 calculates the predicted object image plane position (second predicted image plane position) at the second time point that is a future time point of a first time point at which the predicted object image plane position (first predicted image plane position) is calculated in the step S403. The camera controller 212 then calculates the second lens driving amount to be transmitted to the lens controller 106 by using the second predicted image plane position. When the lens driving velocity is higher than the predetermined driving velocity V1, the second lens driving amount may increase as the lens driving velocity is higher, and may decrease as the lens driving velocity is lower.

The camera controller 212 transmits, to the lens controller 106, a focusing instruction including the lens driving amount and the lens driving velocity which are set as described above. The lens controller 106 drives the focus lens 103 via the focusing driver 105 according to the received lens driving amount and lens driving velocity. By instructing the lens driving amount and the lens driving velocity to the lens controller 106, the camera controller 212 can make it possible to make the focus follow well the object moving at the high velocity, and the focus follow well on the object that accelerates and decelerates.

When the object is moving at a constant velocity, the camera controller 212 may instruct only the lens driving velocity without instructing the lens driving amount. When driving the focus lens 103 in the step S406, the camera controller 212 may perform the prediction processing again in the step S403 between two adjacent detection timings for detecting the defocus amount, and may update the lens driving amount and the lens driving velocity which are instructed to the lens controller 106.

Next in the step S407, the camera controller 212 determines whether the imaging has been completed. When the imaging has been completed, the AF processing is terminated. When the imaging has not been completed, the process returns to the step S401, and the camera controller 212 detects the focus again.

In the step S408, the camera controller 212 transmits, to the lens controller 106, an instruction for driving the focus lens 103 at a preset lens driving velocity (search lens driving velocity) to search for the object, and then returns to the step S401 to detects the focus again. The search lens driving velocity may be a fixed value or a value selected by the user. The lens controller 106 drives the focus lens 103 via the focusing driver 105 according to the received search lens driving velocity.

Figure 6:
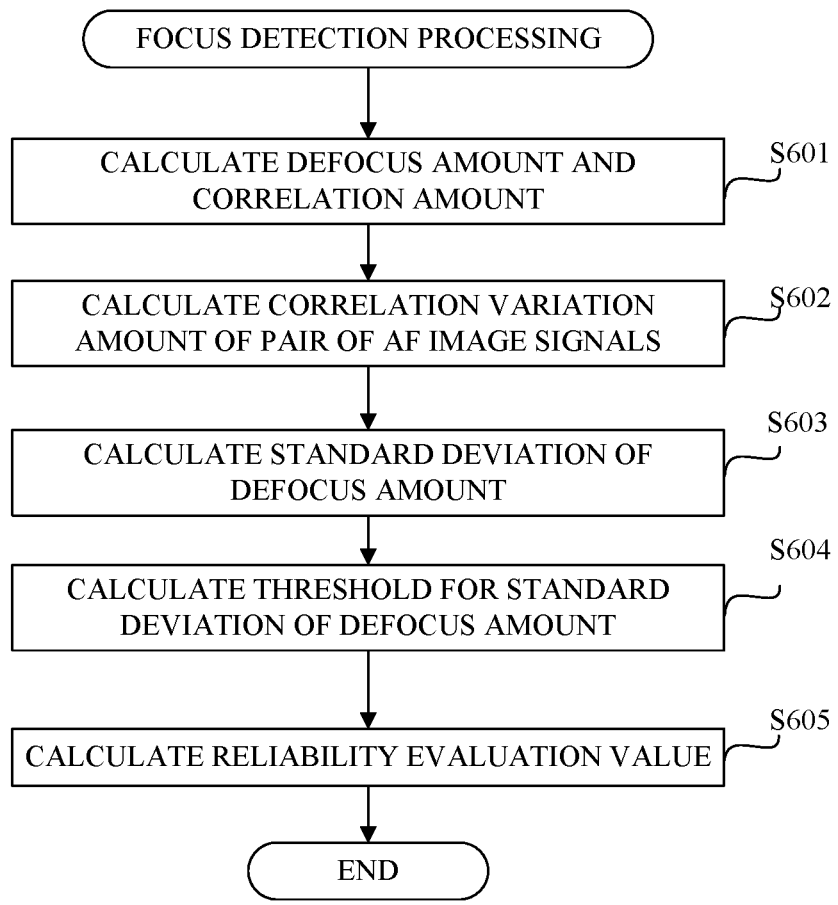
FIG. 6 is a flowchart describing focus detection processing according to the first embodiment.

The flowchart in FIG. 6 describes the focus detection processing performed by the camera controller 212 (AF controller 213) in the step S401 in FIG. 4. In the step S601, the camera controller 212 causes the AF signal processor 204 to operate the correlation calculation on the pair of the AF image signals acquired from the image sensor 201. Thereafter, the camera controller 212 calculates the defocus amount from a shift amount Shift. The shift amount Shift is the image shift amount and gives the minimum value of a correlation amount received from the AF signal processor 204. The camera controller 212 causes the AF signal processor 204 to calculate the correlation amount of the pair of the AF image signals for each shift amount Shift. Further, the camera controller 212 generates a waveform of the correlation amount for each shift amount Shift received from the AF signal processor 204.

Figure 3:
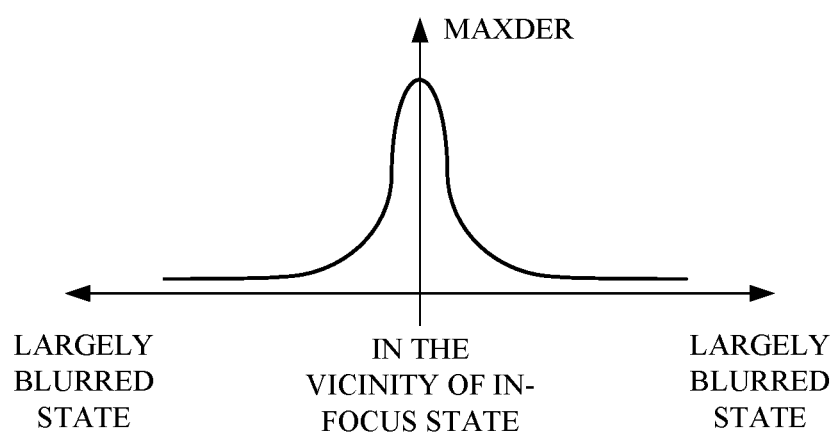
FIG. 3 is a diagram illustrating an evaluation value for a variation amount of a correlation between two images according to the first embodiment.

Next in the step S602, the camera controller 212 calculates a correlation variation amount of the pair of the AF image signals. FIG. 3 illustrates an example of the correlation variation amount when the focus lens 103 is driven from a state (largely blurred state) where a blur level in the object image is large to the vicinity of an in-focus state, in the imaging plane phase difference AF. A horizontal axis represents the blur level, and a vertical axis represents a correlation variation amount MAXDER. The correlation variation amount MAXDER can be calculated using the following expression (2).

$$MAXDER(k)=(COR[k-3]-COR[k-1])-(COR[k-2]-COR[k]) \quad (2)$$

In expression (2), k is an integer variable for specifying a position, and COR [k] is the correlation amount of the pair of the AF image signals at the position k. In the imaging plane phase difference AF, the value of the correlation variation amount increases as the blur level approaches the in-focus state from the largely blurred state.

Next in the step S603, the camera controller 212 uses the correlation variation amount MAXDER to calculate a standard deviation Defocus 3σ of the defocus amount by the following expression (3).

$$Defocus3\sigma = K \times (A \times MAXDER^B) \quad (3)$$

K in the expression (3) is a conversion coefficient for converting the image shift amount into the defocus amount, and A and B are the conversion coefficients for converting the correlation variation amount MAXDER into the standard deviation of the image shift amount. The camera controller 212 substitutes the correlation variation amount MAXDER calculated in the step S603 into the expression (3), and calculates the standard deviation Defocus 3σ of three pieces of defocus amount data.

Next in the step S604, the camera controller 212 calculates Def3σTH3, Def3σTH2, and Def3σTH1 as thresholds for the standard deviation Defocus 3σ of the defocus amount, in order to calculate a reliability evaluation value Rel represents the reliability of the defocus amount.

Next in the step S605, the camera controller 212 calculates the reliability evaluation value Rel using the calculated threshold value. The reliability evaluation value Rel is expressed by four stages of reliability evaluation values Rel3, Rel2, Rel1, and Rel0 in order from the highest reliability to the lowest reliability, and is defined by the following expression (4).

Rel=Rel3,when Defocus3σ≤Def3σTH3;

Rel=Rel2,when Def3σTH3<Defocus3σ≤Def3σTH2;

Rel=Rel1,when Def3σTH2<Defocus3σ≤Def3σTH1; and

Rel=Rel0,when Def3σTH1≤Defocus3σ   (4)

The camera controller 212 calculates the reliability evaluation value Rel as described above, and thereafter terminates the focus detection processing.

Second Embodiment

Figure 7:
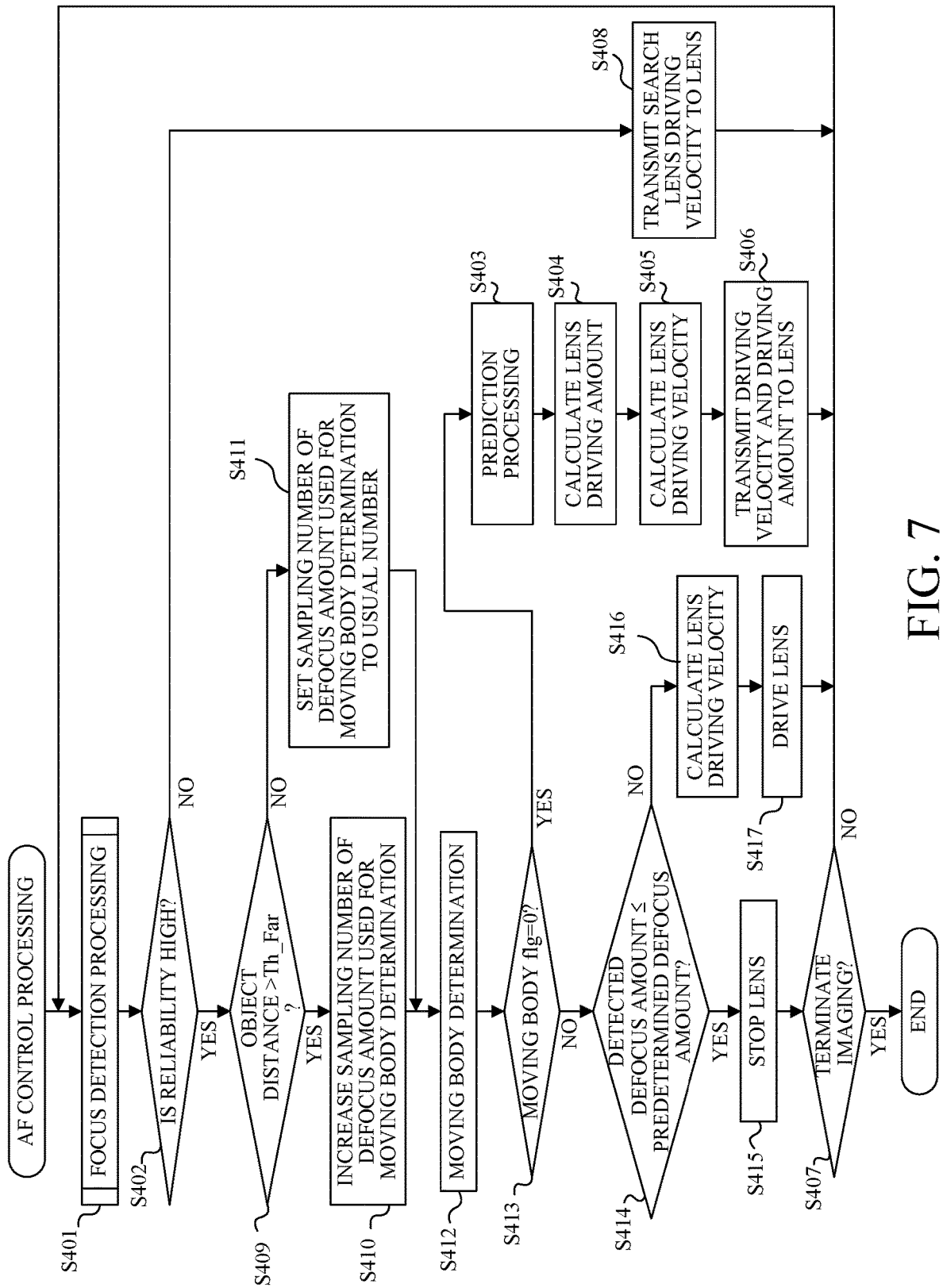
FIG. 7 is a flowchart describing AF control processing in motion image capturing according to a second embodiment of the present invention.

The flowchart in FIG. 7 describes the AF control processing at the time of capturing the motion image in the second embodiment of the present invention. The steps S401 to S408 in FIG. 7 are the same as those in the first embodiment (FIG. 4). The configuration of the camera in this embodiment is the same as that in the first embodiment (FIG. 1).

After the steps S401 and S402, the camera controller 212 determines whether the object distance is longer than a predetermined distance Th_Far, in the step S409. Moving body determination in the step S412 described later determines whether the object is the moving body based on a tendency toward approach or recession of the plurality of defocus amounts sampled in a certain period. Thus, the larger the number of defocus amounts for calculating the tendency toward approach or recession, the more slowly the tendency toward approach or recession is calculated, and the more insensitive the moving body determination becomes. On the other hand, the smaller the number of defocus amounts, the more quickly the tendency toward approach or recession is calculated, and thus the more sensitive the moving body determination becomes.

When the object distance is longer than Th_Far, the camera controller 212 determines that the object is at a long distance, and the process proceeds to the step S410. Because the image plane position of the far object slowly moves, the moving body determination may be insensitive. Thus, in the step S410, the camera controller 212 makes the moving body determination insensitive by increasing the sampling number of the defocus amount used for the moving body determination more than a usual sampling number. In other words, the camera controller 212 sets the sensitivity of the motion determination to a first sensitivity. Subsequently, the process proceeds to the step S412.

On the other hand, when the object distance is equal to or smaller than Th_Far, the camera controller 212 determines that the object is in a short distance, and the process proceeds to the step S411. Because the image plane position of the close object moves fast, it is better to make the moving body determination sensitive and to make the focusing control quickly follow the movement of the image plane position. Thus, in the step S411, the camera controller 212 sets, to the usual number, the sampling number of the defocus amount used for the moving body determination, in order to quickly determine whether the object is the moving body. In other words, the camera controller 212 sets the sensitivity of the moving body determination to a second sensitivity higher than the first sensitivity. Thereafter, the process proceeds to the step S412.

In the step S412, the camera controller 212 determines whether the object is the moving body by using the defocus amount of the sampling number set in the step S410 or the step S411.

Next in the step S413, the camera controller 212 confirms whether the object is determined to be the moving body in the step S412 (moving body flag flg=0). When the camera controller 212 does not determine that the object is the moving body, the process proceeds to the step S414. When the camera controller 212 determines that the object is the moving body, the process proceeds to the step S403.

In the steps S403 to S406, the AF control (first control) is performed on the moving object as described in the first embodiment.

On the other hand, in the step S414, the camera controller 212 determines whether the defocus amount detected in the step S401 is less than or equal to a predetermined defocus amount. The predetermined defocus amount is a threshold value for determining whether the detected defocus amount indicates the vicinity of the in-focus state. When the detected defocus amount is less than or equal to the predetermined defocus amount, the state is already in the vicinity of the in-focus state. Thus, the camera controller 212 proceeds to the step S415 and stop driving the focus lens 103. Thereafter, the process proceeds to the step S407. On the other hand, when the detected defocus amount is larger than the predetermined defocus amount, the camera controller 212 proceeds to the step S416.

In the step S407, the camera controller 212 determines that the motion image capturing has completed, and terminates the AF processing. When the motion image capturing has not been completed yet, the camera controller 212 returns to the step S401 and performs the focus detection processing again.

In the steps S416 and S417, the camera controller 212 controls the AF (second control) for a non-moving object. In the step S416, the camera controller 212 calculates the detected object image plane position based on the defocus amount detected in the focus detection processing of the step S401, and calculates the lens driving velocity for aligning (making it close) the lens image plane position to the calculated detected object image plane position. If the camera controller 212 continues to sensitively and quickly focus on the non-moving object, the motion image includes the motion of the quick focusing, and the quality of the motion image deteriorates. Particularly, in the vicinity of the in-focus state, overrun may occur in which the focus lens 103 is driven over the in-focus position. Hence, the camera controller 212 sets the lens driving velocity to a low velocity so as to more slowly adjust the focus as the state approach the in-focus state, and improves the quality of the motion image. Because the quality of the motion image is deteriorated by frequently moving or stopping the focus lens 103, the camera controller 212 sets the lens driving velocity so as to continuously move the focus lens 103 without stopping it at the time of capturing the motion image.

In the step S417, the camera controller 212 transmits the focusing instruction including the lens driving velocity calculated in the step S416 to the lens controller 106 in order to drive the focus lens 103 so as to align the lens image plane position with the object image plane position of the non-moving object. The lens controller 106 drives the focus lens 103 via the focusing driver 105 according to the received lens driving velocity. Thereafter, the camera controller 212 returns to the step S401 and detects the focus again.

Third Embodiment

Next, a description will be given of the AF control processing at the time of capturing the motion image in the third embodiment of the present invention. The configuration of the camera in this embodiment is the same as that in the first embodiment (FIG. 1).

When the AF control (second control) for the non-moving object described in the second embodiment is switched to the AF control (first control) for the moving object, the motion image may include a conspicuous acceleration/deceleration of the focus lens 103 and the quality of the motion image may deteriorate. This embodiment smoothly switches the AF control for the non-moving object to the AF control for the moving object in order that the quality of the motion image does not deteriorate.

Figure 8:
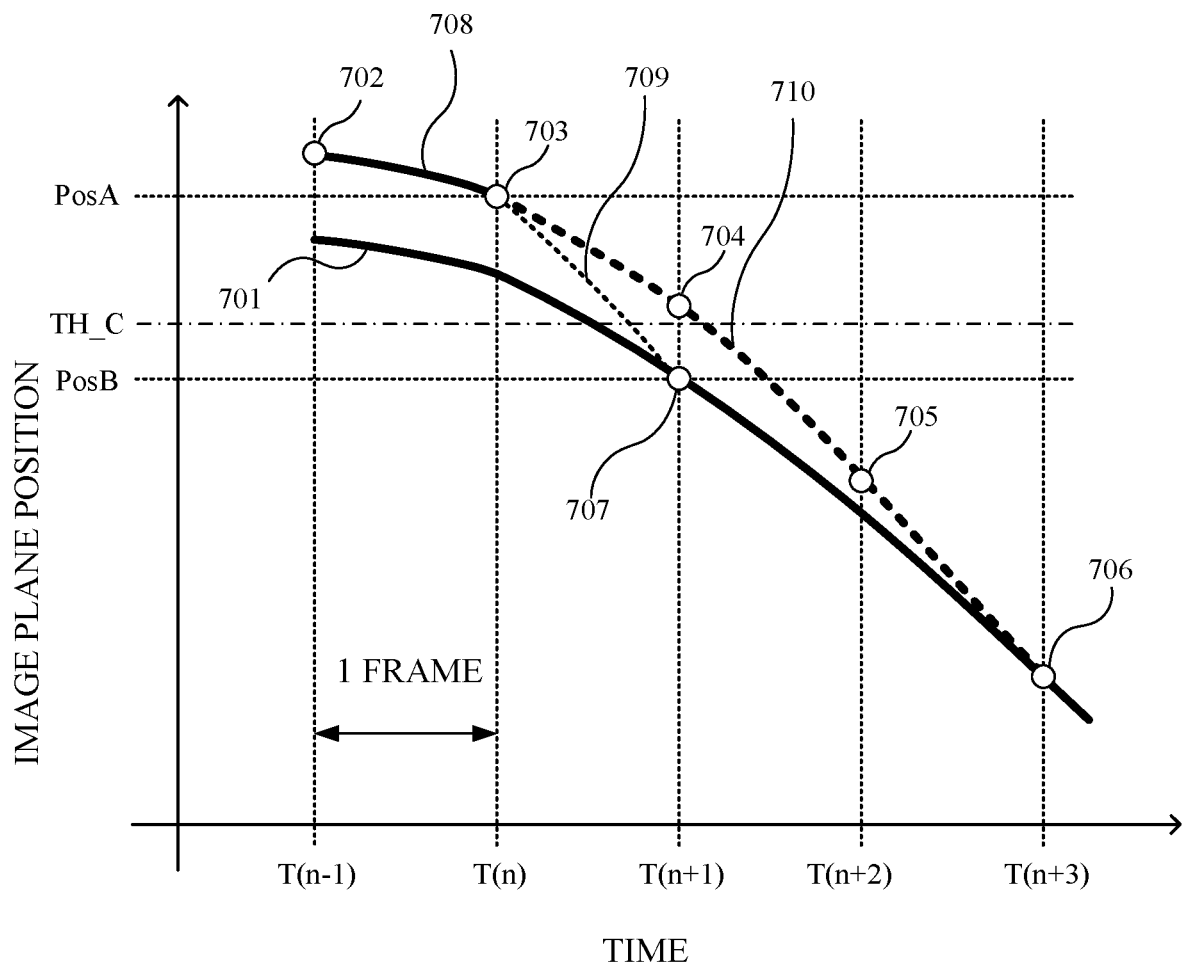
FIG. 8 is a diagram illustrating a relationship between a lens image plane position and an object image plane position according to a third embodiment of the present invention.

FIG. 8 describes a relationship between the lens image plane position and the detected object image plane position in this embodiment. The vertical axis represents the image plane position and the horizontal axis represents the time. In the figure, until time T(n−1), which is one frame before current time T(n), the object is determined to be the non-moving body, and the AF control is performed for the non-moving object. At the current time T(n), the object is determined to be the moving body, the AF control switches, and the AF control is performed for the moving object thereafter.

A curved line (solid line) 701 indicates the actual object image plane position. It is assumed that the predicted object image plane position calculated by the prediction processing substantially matches the actual object image plane position. Circles 702 to 707 represent the lens image plane positions at the respective times. A curved line (solid line) 708, a curved line (dotted line) 709 and a curved line (broken line) 710 represent the lens image plane positions.

The AF control for the moving object starts and the focus lens 103 is driven from a lens image plane position 703 at the current time T(n) toward the predicted object image plane position. For aligning the lens image plane position with the predicted object image plane position in the shortest time from the current time T (n), the focus lens 103 may drive from the lens image plane position to the position 707 at next time frame T(n+1). However, if the focus lens 103 drives in this manner, as indicated by the curved line 709, the variation in the lens image plane position becomes larger than that as indicated by the curved line 708, and thus the quality of the motion image may deteriorate.

Using a threshold Th_C, this embodiment evaluates a difference between the lens image plane position (referred to as PosA hereinafter) 703 and the predicted object image plane position (referred to as PosB hereinafter) at the current time T (n). When the difference between PosA and PosB is larger than Th_C, it is determined that the variation amount of the lens image plane position is too large. The focus lens 103 drives so as to move the lens image plane position toward the predicted object image plane position of a time frame which is a plurality of frames after the current time T(n). Namely, the camera controller 212 controls the lens driving velocity so as to focus on the object at the plurality of the frames after.

FIG. 8 illustrates a case where the focus lens 103 drives so as to move the lens image plane position toward the predicted object image plane position three frames after the current time T(n). In this case, the camera controller 212 calculates the lens driving velocity such that the lens image plane position slowly moves toward the lens image plane position 706 of time T(n+3), three frames after the current time T (n), as indicated by the curved line 710 which is gentler than the curved line 709. The camera controller 212 causes the lens controller 106 to drive the focus lens 103 with the calculated lens driving velocity.

By setting the lens driving velocity as described, the camera controller 212 can moderate the variation in the lens image plane position when switching the AF control from the AF control for the non-moving object to the AF control for the moving object, and can capture a high-quality motion image. The "three frames after" is merely an example, it may be two frames or more after, and may be at least three frames after.

In each embodiment, the focusing control moves the focus lens as the focusing element to the optical axis direction, but the focusing control may move the image sensor as the focusing element to the optical axis direction.

Although the lens interchangeable camera system has been described in each embodiment, a lens integrated camera is also included in the embodiments of the present invention.

Fourth Embodiment

Next, a description will be given of the AF control processing at the time of capturing the motion image in the fourth embodiment of the present invention. In the second embodiment, an example has been given for the AF control processing at the time of capturing the motion image, where the AF control (first control) for the moving object and the AF control (second control) for the non-moving object has been selectively used based on the result of the moving body determination.

However, in the above example, depending on the imaging situation, the camera controller 212 may not select the AF control suitable for the imaging scene and the focus may not follow the object well. For example, when the camera images a plurality of objects at positions close to each other and having different distances from the camera while panning and switching the objects, the suitable AF control may not be selected. For capturing the high-quality motion image, the camera controller 212 may select the AF control (second control) for the non-moving object when switching the object.

The AF signal processor 204 may erroneously calculate the defocus amount of the intermediate distance when operating the correlation calculation on the area (focus detection area) simultaneously includes the objects at different distances (that is, perspective conflict occurs). Further, the erroneously calculated defocus amount of the intermediate distance varies as a ratio of the objects varies in the focus detection area during the object switching. As a result, the camera controller 212 may erroneously determine that the non-moving object is the moving body, may select the AF control (first control) for the moving object, may cause the quick focus variation during the prediction processing, and may decrease the quality of the motion image.

Figure 12:
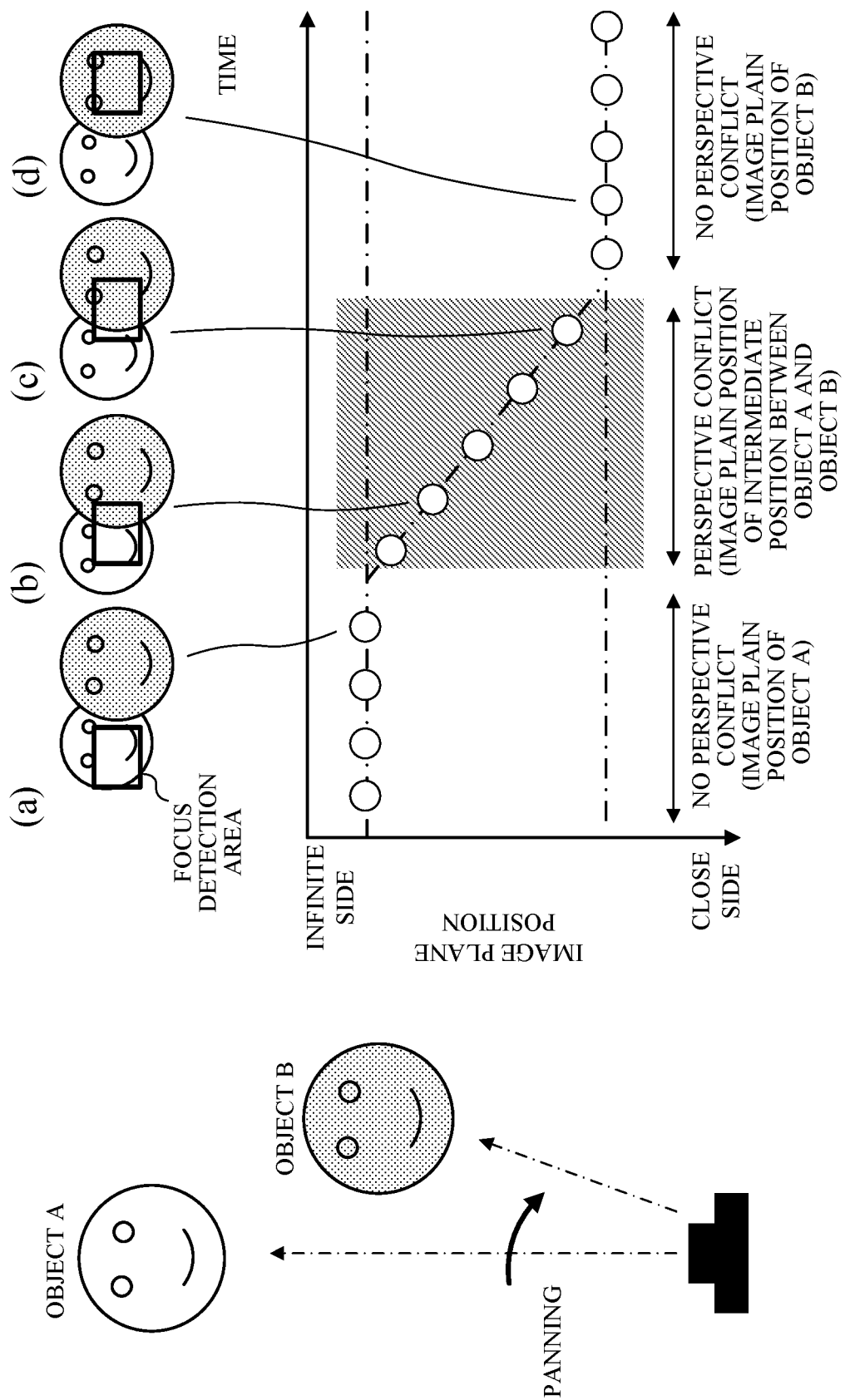
FIG. 12 is a diagram describing a time-series variation in an image plane position when an object is switched by panning according to the fourth embodiment.

FIG. 12 gives an example of a time-series variation in the image plane position when the camera switches an AF control target from an object A to an object B by panning while imaging the objects. At a time point (a) in FIG. 12, the perspective conflict does not occur, and the image plane position of the object A is detected. At time points (b) and (c), the perspective conflict occurs, and the image plane position of the intermediate position between the objects A and B is detected in accordance with the ratio of the objects included in the focus detection area. At a time point (d), the perspective conflict does not occur, and the image plane position of the object B is detected. Thus, even when both the objects A and B are non-moving objects, they may be erroneously determined to be the moving bodies due to the tendency toward approach or recession in the image plane position caused by the influence of the perspective conflict.

FIG. 12 gives the example in which the objects A and B partially overlap with each other in the angle of view. When the objects A and B are separated from each other in the angle of view and do not overlap with each other, and the camera pans from the object A to the object B, the focus detection area switches from the object A to the background and from the background to the object B. In such a case, the perspective conflict may occur between the object A and the background and between the background and the object B, and similarly, the objects may be erroneously determined to be the moving bodies.

In order to solve such a problem, this embodiment performs determination processing to determine whether the object is switched and whether the perspective conflict occurs. When it is determined that the object is switched or the perspective conflict occurs, by selecting the AF control (second control) for the non-moving object, the camera can prevent it from deteriorating the quality of the motion image captured by switching the objects.

It is effective to make either one of the determinations for the switching of the object or for the perspective conflict, but it may be more certain to make both the determinations.

Figure 9A:
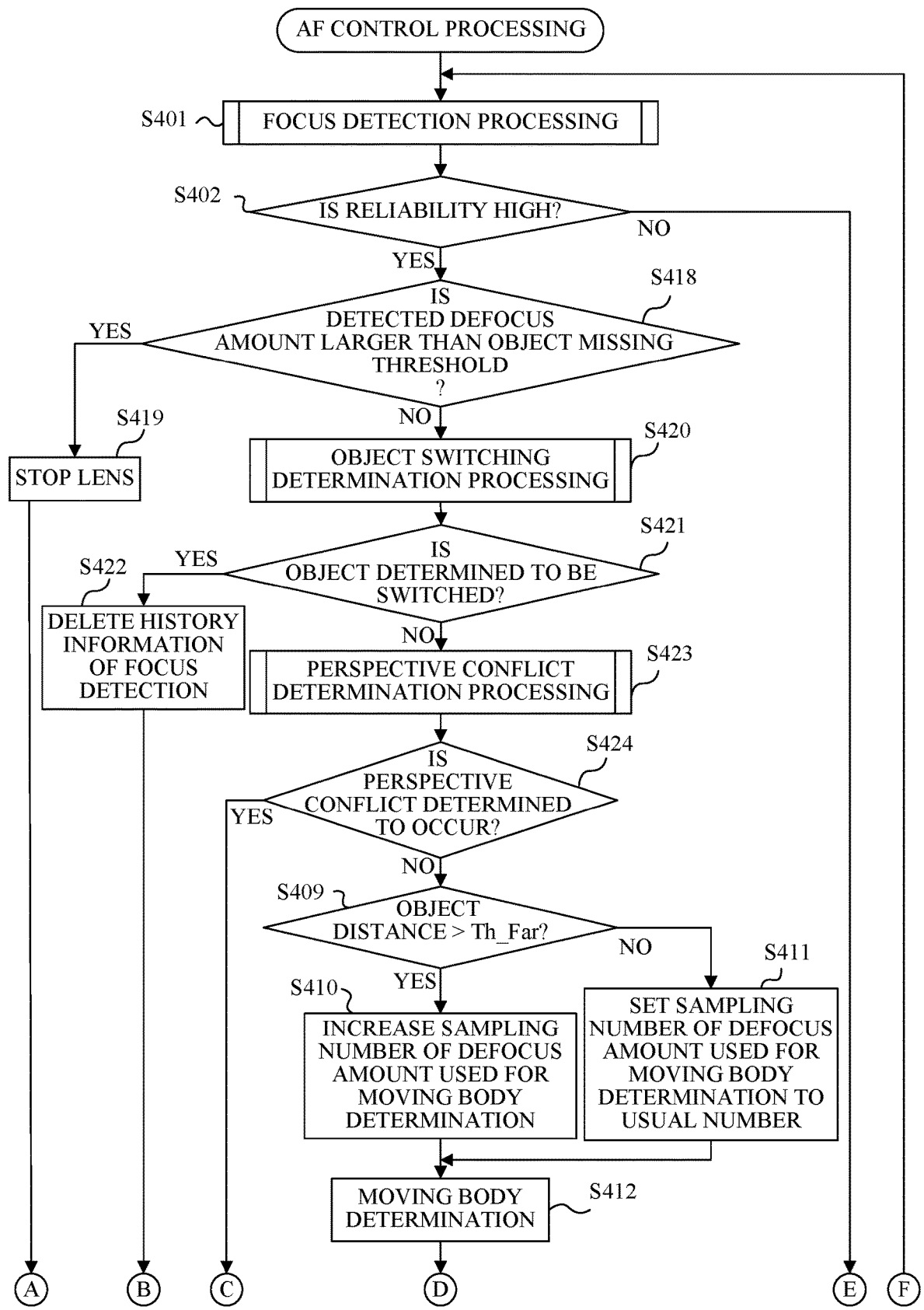
FIGS. 9A and 9B are flowcharts describing AF control processing in motion image capturing according to a fourth embodiment of the present invention.
Figure 9B:
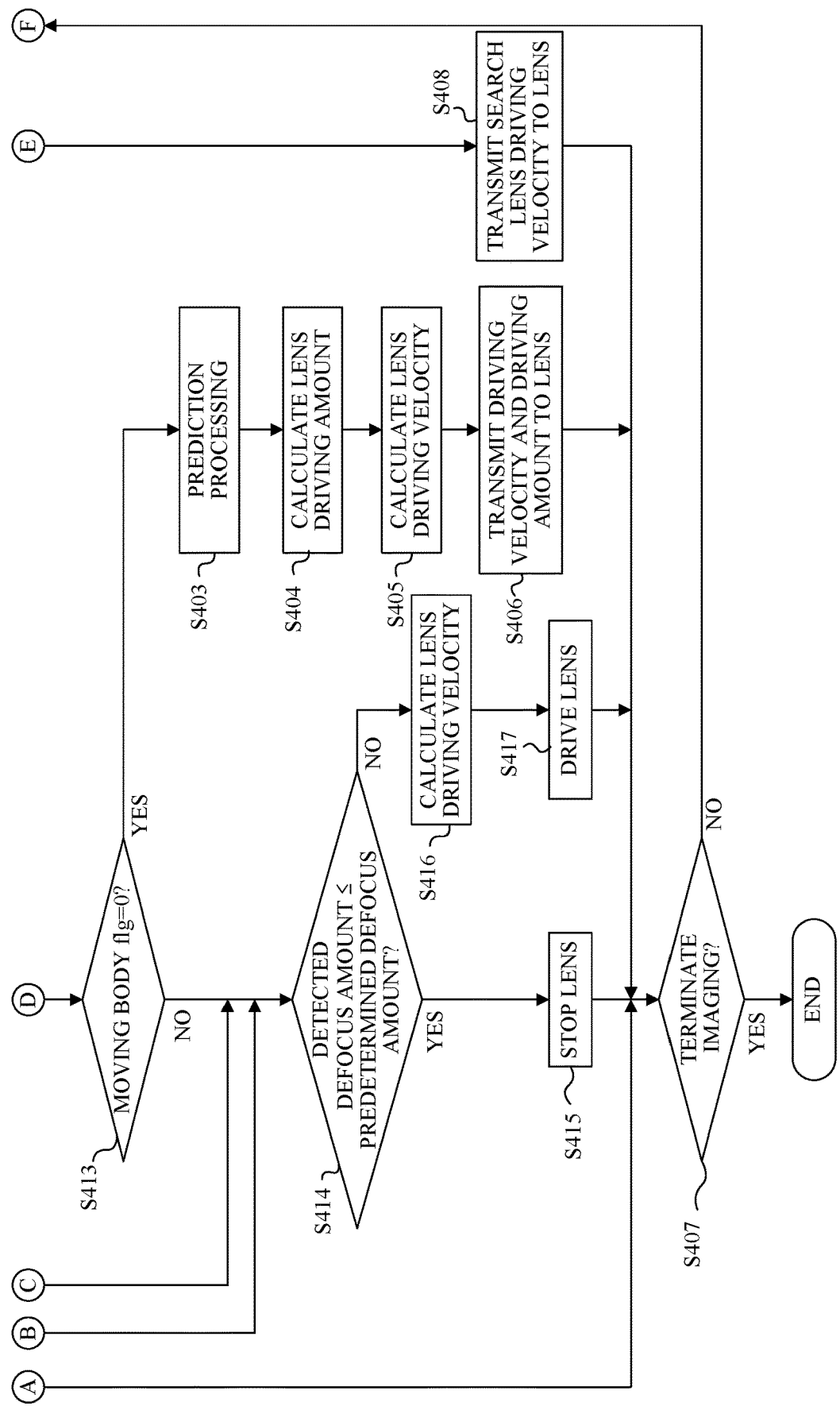

The flowcharts in FIGS. 9A and 9B describes the AF control processing at the time of capturing the motion image in this embodiment. The steps S401 to S408 in FIGS. 9A and 9B are the same as those in the first embodiment (FIG. 4). The steps S409 to S417 given in FIGS. 9A and 9B are the same as those in the second embodiment (FIG. 7). The configuration of the camera in this embodiment is the same as that in the first embodiment (FIG. 1).

After the steps S401 and S402, the camera controller 212 determines whether the detected defocus amount is larger than a predetermined object missing threshold in the step S418. When the detected defocus amount is larger than the predetermined object missing threshold, the process proceeds to the step S419. When the detected defocus amount is not larger than the predetermined object missing threshold, the process proceeds to the step S420. This process is to determine whether the camera detects the defocus amount of the object not intended by the user, such as an obstacle in front of the main object or the background.

When the detected defocus amount is larger than the predetermined object missing threshold, the image plane position and the detection time corresponding to the defocus amount may be deleted from the memory area stored in the step S401. Such image plane position and detection time may cause the camera controller 212 to erroneously determine that the non-moving object is the moving body, or may cause the camera controller 212 not to properly predict the movement of the moving object during the prediction processing of the AF control (first control) for the moving object.

In the step S419, the camera controller 212 determines that the detection has made for the defocus amount of the object not intended by the user. The camera controller 212 stops driving the focus lens 103 when the focus lens 103 is being driven.

In the step S420, the camera controller 212 performs the object switching determination processing to determine whether the user has switched the object targeted for the AF control. A detailed description will be given later of the object switching determination processing with reference to FIG. 10.

In the step S421, the camera controller 212 determines whether it is determined that the user has switched the object in the object determination processing in the step S420. When it is determined that the object has been switched, the process proceeds to the step S422. When it is determined that the object has not been switched, the process proceeds to the step S423.

In the step S422, the camera controller 212 deletes information (data relating to the defocus amount) relating to the image plane position of the object and the detection time thereof, which are stored over the plurality of times in the past. The object is not determined to be the moving body in the step S412 until the subsequent focus detection accumulates the sufficient number of the information on the image plane positions of the object again.

When the camera controller 212 determines in the step S421 that the object has not been switched, the process proceeds to S423. In the step S423, the camera controller 212 performs perspective conflict determination processing for determining whether the perspective conflict has occurred in the focus detection in the step S401. A detailed description will be given later of the perspective conflict determination processing with reference to FIG. 11.

In the step S424, the camera controller 212 determines whether the perspective conflict has occurred in the step S423. When the camera controller 212 determines that the perspective conflict has occurred, the process proceeds to the step S414, and when not, the process proceeds to the step S409.

In the steps S409 to S413, the camera controller 212 determines whether the object is the moving body, as described in the second embodiment.

In the steps S403 to S406, the camera controller 212 performs the AF control (first control) for the moving object, as described in the second embodiment.

In the steps S414 to S417, the camera controller 212 performs the AF control (second control) for the non-moving object, as described in the second embodiment.

Figure 10:
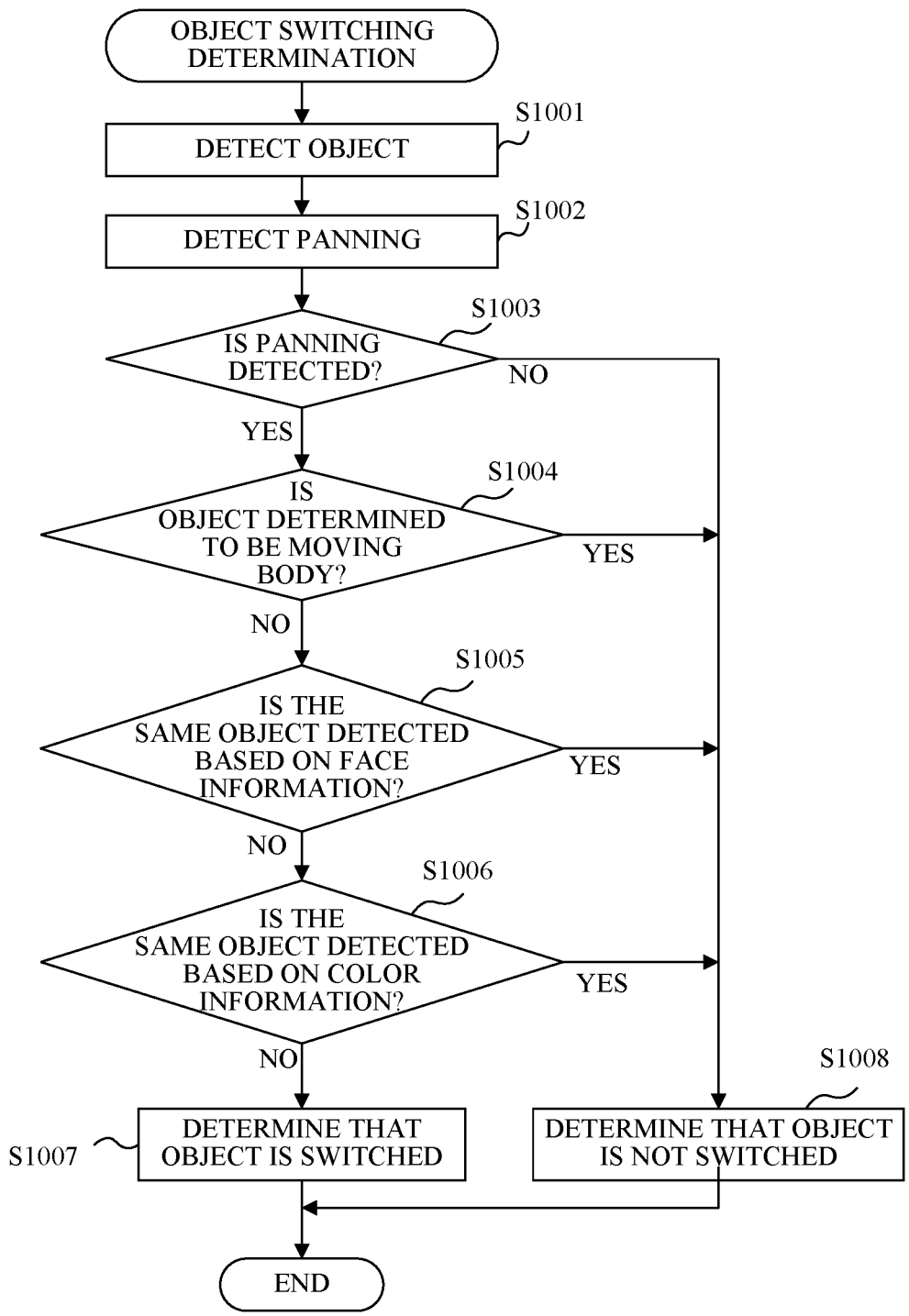
FIG. 10 is a flowchart describing object switching determination processing according to the fourth embodiment.

Next, a description will be given of the object switching determination processing performed by the camera controller 212 in the step S420 in FIG. 9A, with reference to the flowchart in FIG. 10.

First in the step S1001, the camera controller 212 causes the object detector 216 to detect information on brightness of the object based on the output signal from the image sensor 201. The information on the brightness of the object is, for example, the color information or the face information of the object. The camera controller 212 generates identification information for distinguishing different objects based on the detected color information and face information.

Next in the step S1002, the camera controller 212 causes the shake detector 217 to detect the current shake amount of the camera. The shake amount is, for example, an angular velocity or angular acceleration.

In the step S1003, the camera controller 212 determines whether the panning is detected in the step S1002. Specifically, when the detected shake amount is equal to or larger than a predetermined shake threshold, it is determined that the panning is detected. When the camera controller 212 determine that the panning is detected, the process proceeds to the step S1004, and when not, the process proceeds to the step S1008.

In the step S1004, the camera controller 212 determines whether the object has already been determined to be the moving body in the previous AF control of the step S412 in FIG. 9A. When the camera controller 212 determines that the object is the moving body, the process proceeds to the step S1008, and when not, the process proceeds to the step S1004.

In the step S1005, the camera controller 212 determines whether the object targeted for the current AF control is the same as the object previously targeted for the AF control by using the identification information based on the face information detected by the object detector 216. When the camera controller 212 determines that the current object is the same as the previous object, the process proceeds to the step S1008, and when not, the process proceeds to the step S1006.

In the step S1006, the camera controller 212 determines whether the object targeted for the current AF control is the same as the object previously targeted for the AF control by using the identification information based on the color information detected by the object detector 216. When the camera controller 212 determines that the current object is the same as the previous object, the process proceeds to the step S1008, and when not, the process proceeds to the step S1007.

In the step S1007, the camera controller 212 determines that the user has switched the object, and terminates the object switching determination processing.

In the step S1008, the camera controller 212 determines that there is no object switching by the user, and terminates the object switching determination processing.

As described above, the camera controller 212 identifies the presence/absence of the object switching by the object switching determination processing from the steps S1001 to S1008. When the camera controller 212 determines that the object has been switched by the panning, the camera controller 212 performs the AF control (second control) for the non-moving object. On the other hand, when the camera controller 212 determines that the object has not been switched and that the camera is imaging the same object while panning, the camera controller 212 selects either the first control or the second control based on the result of the moving body determination in the step S412. Thus, it is possible to select the AF control suitable for the imaging scene.

Figure 11:
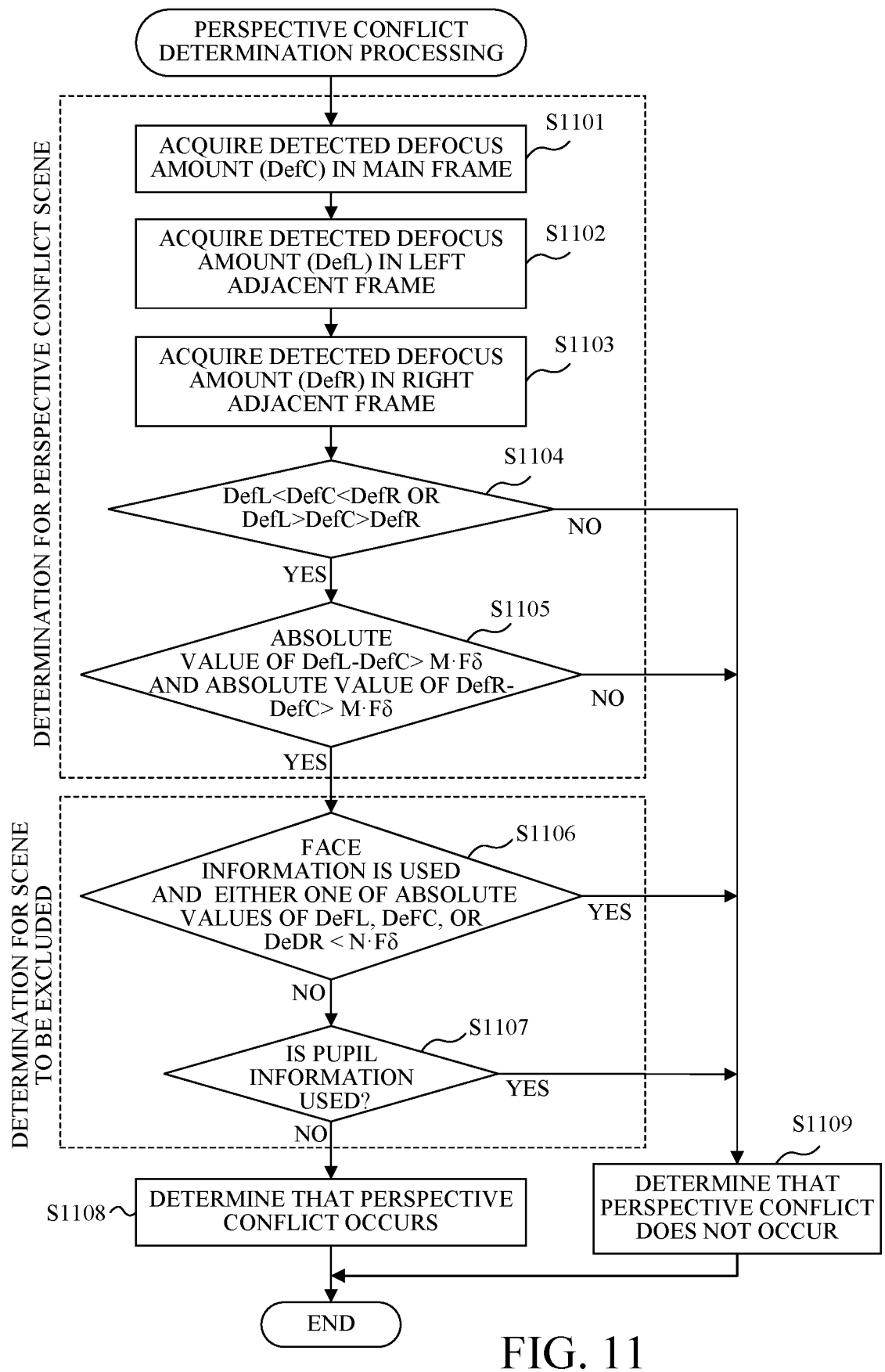
FIG. 11 is a flowchart describing perspective conflict determination processing according to the fourth embodiment.

Next, a description will be given of the perspective conflict determination processing performed by the camera controller 212 in the step S423 in FIG. 9A with reference to the flowchart in FIG. 11. In the perspective conflict determination processing, this embodiment sets a correlation calculation area (main frame) as a main focus detection area used during the focus detection and a correlation calculation area (adjacent frame) adjacent thereto, and makes a determination on the perspective conflict based on the detected defocus amount.

First in the step S1101, the camera controller 212 acquires a detected defocus amount (DefC) in the main frame.

In the steps S1102 and S1103, the camera controller 212 acquires detected defocus amounts of the left and right adjacent frames adjacent to the main frame (the detected defocus amount DefL of the left adjacent frame and the detected defocus amount DefR of the right adjacent frame), respectively.

Next in the step S1104, the camera controller 212 compares a magnitude relationship of the acquired three detected defocus amounts. Specifically, it is determined whether the detected defocus amount of the main frame is an intermediate value between the detected defocus amounts of the left and right adjacent frames. When the detected defocus amount of the main frame takes the intermediate value, the camera controller 212 proceeds to the step S1105, and when not, the camera controller 212 determines in the step S1109 that the perspective conflict does not occur.

In the step S1105, the camera controller 212 determines whether the absolute value of the difference between the detected defocus amounts of the main frame and the adjacent frames is larger than a threshold $M \cdot F\delta$. That is, the camera controller 212 determines whether the objects at different distances are included in the vicinity of the main frame. This embodiment uses, for example, the coefficient M=0.5. When the camera controller 212 determines the absolute value of the difference is larger than the threshold, the process proceeds to the step S1106, and when not, the camera controller 212 determines in the step S1109 that the perspective conflict does not occur.

In the step S1106, the camera controller 212 determines whether the main frame is disposed based on the face information detected by the object detector 216. Further, the camera controller 212 determines whether the absolute value of the detected defocus amount of either one of the main frame and the adjacent frames is smaller than the threshold $N \cdot F\delta$. When the main frame is disposed based on the face information and the absolute value is smaller than the threshold $N \cdot F\delta$, that is, when a predetermined condition is satisfied, the camera controller 212 determines in the step S1109 that the perspective conflict does not occur. This embodiment uses, for example, the coefficient N=3.0. Namely, even if a scene is determined to include the perspective conflict in the steps before the step S1106, when the camera controller 212 determines that the absolute value of the detected defocus amount for a certain object is sufficiently small, the camera controller 212 exclude the scene from the perspective conflict determination as an exception. On the other hand, when the predetermined condition is not satisfied, the process proceeds to the step S1107.

In the step S1107, the camera controller 212 determines whether the main frame is disposed based on pupil information detected by the object detector 216. When the main frame is disposed based on the pupil information, that is, when a predetermined condition is satisfied, the camera controller 212 determines in the step S1109 that the perspective conflict does not occur. Namely, even if the scene is determined to include the perspective conflict in the steps before the step S1107, when the camera controller 212 measures a certain object, the camera controller 212 excludes the scene from the perspective conflict determination as an exception. On the other hand, when the camera controller 212 determines that the above-described predetermined condition is not satisfied, the process proceeds to the step S1108, and the camera controller 212 determines that the perspective conflict occurs.

As described above, the camera controller 212 determines whether the perspective conflict occurs in the perspective conflict determination processing from the step S1101 to the step S1105, and identifies scenes to be excluded in the processing from the steps S1106 to S1107. Thus, even when the scene is determined to include the perspective conflict, the camera controller 212 can properly determines whether to perform the AF control (first control) for the moving object or the AF control (second control) for the non-moving object in the step S424 in FIG. 9A.

Fifth Embodiment

Next, a description will be given of the AF control processing at the time of capturing the motion image in the fifth embodiment of the present invention. In the second embodiment, an example has been given for the AF control processing at the time of capturing the motion image, where the AF control (first control) for the moving object and the AF control (second control) for the non-moving object has been selectively used based on the result of the moving body determination.

However, in the above example, depending on the imaging situation, the camera controller 212 may not select the AF control suitable for the imaging scene and the focus may not follow the object well. For example, when another object cuts across in front of the main object that is a non-moving body, it is desirable for capturing a high-quality motion image that the camera controller 212 do not perform focus lens driving for following the other object.

However, the camera controller 212 may erroneously determine that the main object moves when the other object cuts across in front of the main object. As a result, the camera controller 212 may select the AF control (first control) for the moving object, may cause the quick focus variation during the prediction processing, and may decrease the quality of the motion image.

In order to solve such a problem, in the fifth embodiment, the camera controller 212 performs determination processing for determining whether or not the detected defocus amount is larger than a predetermined value. When the detected defocus amount is not larger than the predetermined value, the camera controller 212 performs the AF control processing described in the second embodiment. When the detected defocus amount is larger than the predetermined value, the camera controller 212 does not perform the focus lens driving so as to prevent the decrease of the motion image quality. It is desirable for preventing unnecessary focus lens driving in an in-focus state that the predetermined value be set to be equal to or smaller than a value suitable for determining whether or not the focus state is the in-focus state.

Moreover, in the fifth embodiment, the camera controller 212 sets the predetermined value depending on the result of the moving body determination. Specifically, when the main object is the non-moving body, the camera controller 212 sets the predetermined value to a first predetermined value suitable for determining whether or not the focus state is the in-focus state. On the other hand, when the main object is the moving body, the camera controller 212 sets the predetermined value to the first predetermined value or a second predetermined value different from the first predetermined value, depending on whether or not the shifting speed of the image plane that is the change velocity of the detected object image plane position is higher than a predetermined change velocity. It is desirable that the second predetermined value be set to a value suitable for a focus lens driving amount or a focus lens driving velocity that can be set in the AF control (first control) for the moving object.

Figure 13A:
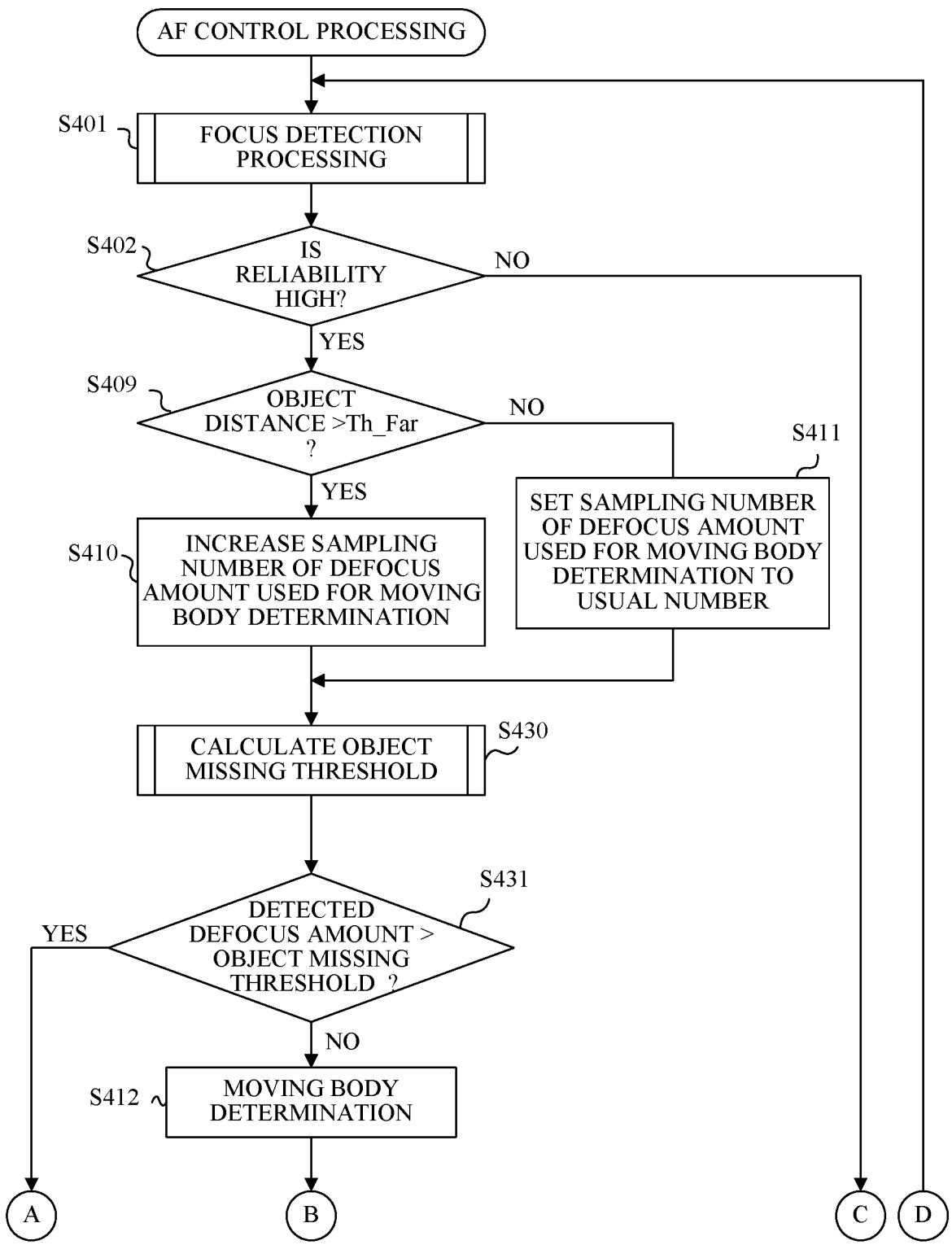
FIGS. 13A and 13B are flowcharts describing AF control processing in motion image capturing according to a fifth embodiment of the present invention.
Figure 13B:
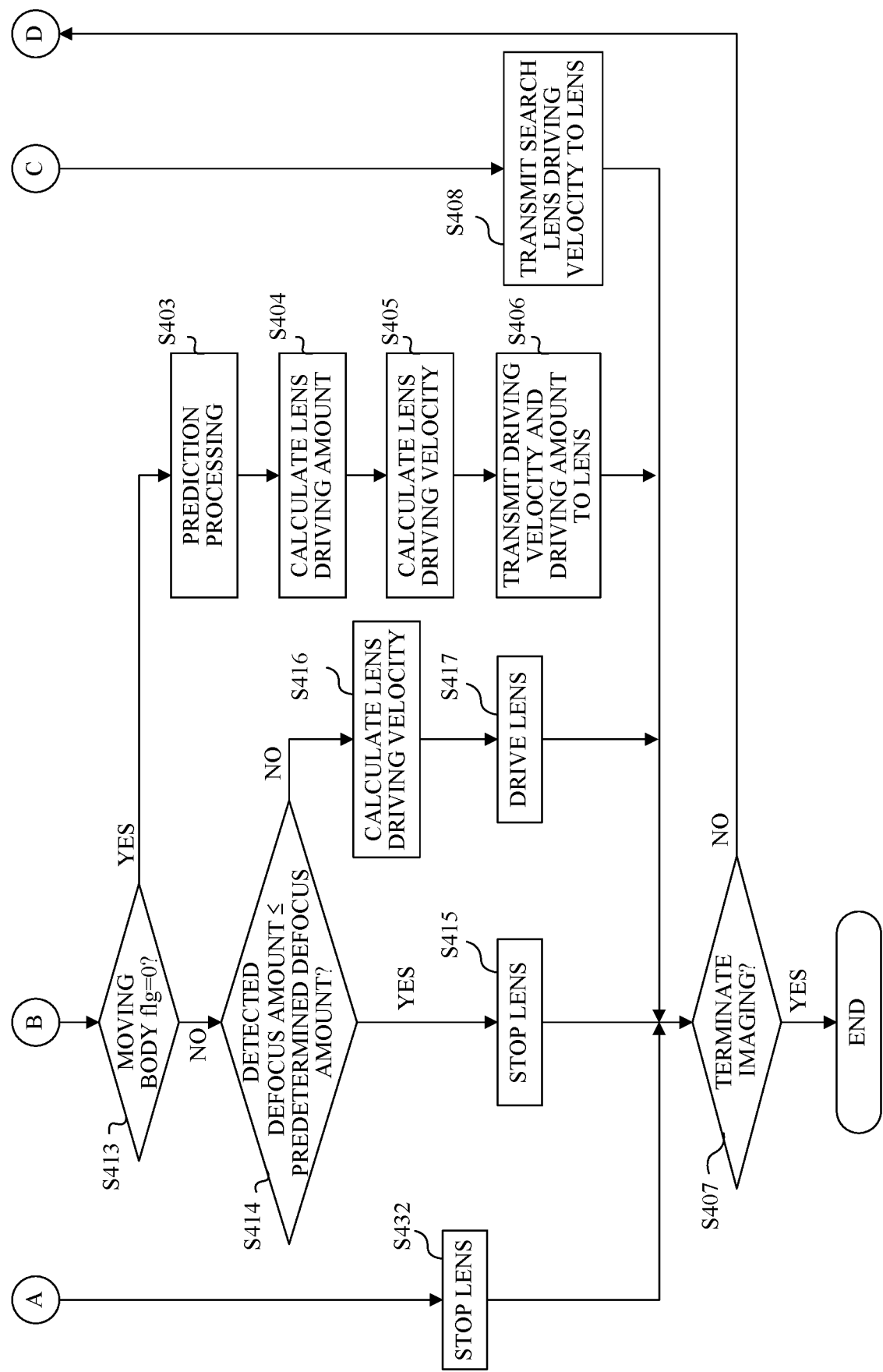

The flowcharts in FIGS. 13A and 13B describes the AF control processing at the time of capturing the motion image in this embodiment. Parts indicated by circled A to D in FIG. 13A and those in FIG. 13B are mutually connected. The steps S401 to S408 in FIGS. 13A and 13B are the same as those in the first embodiment (FIG. 4). The steps S409 to S417 in FIGS. 13A and 13B are the same as those in the second embodiment (FIG. 7). The configuration of the camera in this embodiment is the same as that in the first embodiment (FIG. 1).

After the steps S401, S402 and S409, the process proceeds to the step S410 or the step S411 and then proceeds to the step S430. In the step S430, the camera controller 212 calculates an object missing threshold, which is the above-described predetermined value for the detected defocus amount. The method of calculating the object missing threshold will be described later.

Next, in the step S431, the camera controller 212 determines whether or not the detected defocus amount is larger than the object missing threshold calculated in the step S430, that is, whether or not a predetermined condition is satisfied. The process proceeds to the step S432 when the detected defocus amount is larger than the object missing threshold, and proceeds to the step S412 when the detected defocus amount is not larger than the object missing threshold. This process is to determine whether the defocus amount for an object not intended by the user, such as an obstacle in front of the main object or the background, is detected.

When the detected defocus amount is larger than the object missing threshold, the image plane position and the detection time corresponding to the defocus amount may be deleted from the memory area stored in the step S401. Such image plane position and detection time may cause the camera controller 212 to erroneously determine that the non-moving object is the moving body, or may cause the camera controller 212 not to properly predict the movement of the moving object during the prediction processing of the AF control (first control) for the moving object.

In the step S432, the camera controller 212 considers that the defocus amount for the object not intended by the user is detected and performs, when the focus lens 103 is being driven, control (third control) for stopping the driving of the focus lens 103. Then, the process proceeds to the step S407.

In the steps S412 to S413, the camera controller 212 determines whether the object is the moving body, as described in the second embodiment.

In the steps S403 to S406, the camera controller 212 performs the AF control (first control) for the moving object, as described in the second embodiment.

In the steps S414 to S417, the camera controller 212 performs the AF control (second control) for the non-moving object, as described in the second embodiment.

Figure 14:
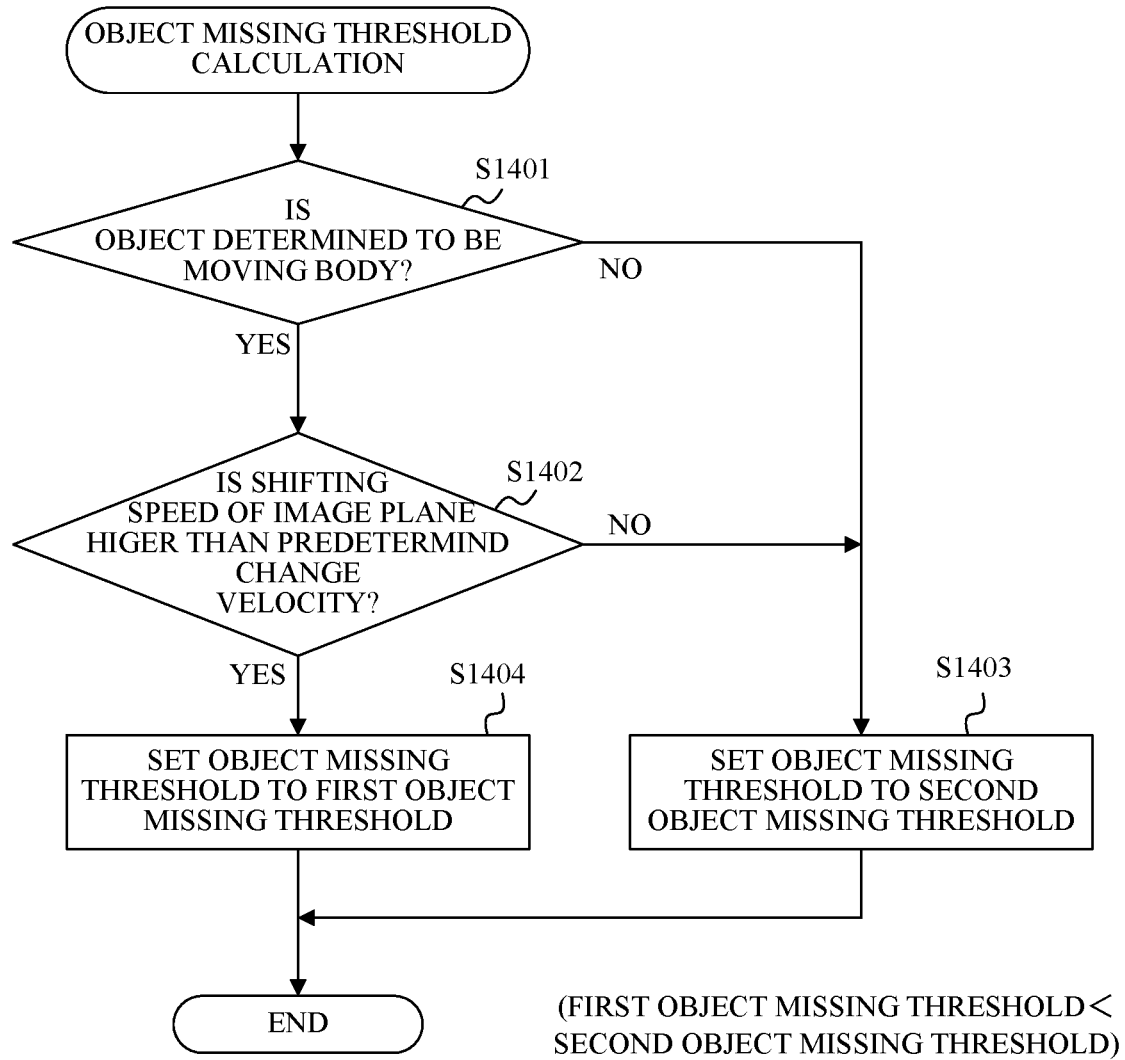
FIG. 14 is a flowchart describing object missing threshold calculation processing according to the fifth embodiment.

Next, a description will be given of object missing threshold calculation processing performed by the camera controller 212 in the step S430 in FIG. 13A, with reference to the flowchart in FIG. 14.

First in the step S1401, the camera controller 212 determines whether or not the object is the moving body. The determination of whether or not the object is the moving body is made by the same method as that described in the steps S412 and S413 in the second embodiment. The process proceeds to the step S1402 when the object is the moving body, and proceeds to the step S1403 when the object is not the moving body.

In the step S1402, the camera controller 212 determines whether or not the shifting speed of the image plane is higher than the predetermined change velocity. The process proceeds to the step S1404 when the shifting speed of the image plane is higher than the predetermined change velocity, and proceeds to the step S1403 when the shifting speed of the image plane is not higher than the predetermined change velocity.

In the step S1403, the camera controller 212 sets the object missing threshold to a first object missing threshold (first predetermined value), and then ends the process.

In the step S1404, the camera controller 212 sets the object missing threshold to a second object missing threshold (second predetermined value) that is larger than the first object missing threshold, and then ends the process.

As described above, the camera controller 212 calculates, when the object is determined to be the moving body, the object missing threshold for the detected defocus amount depending on the shifting speed of the image plane. When the detected defocus amount is larger than the object missing threshold, the camera controller 212 considers that the defocus amount for the object not intended by the user is detected and stops the driving of the focus lens 103. On the other hand, when the detected defocus amount is not larger than the object missing threshold, the camera controller 212 performs the AF control as the first or second control as described in the second embodiment. As a result, the AF control appropriate for the case where the other object cuts across in front of the main object that is the non-moving body can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiment can perform high-quality focusing control even when the moving velocity of object varies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-120685, filed on Jun. 28, 2019, 2020-060241, filed on Mar. 30, 2020 and 2020-097555, filed on Jun. 4, 2020 which are hereby incorporated by reference herein in their entirety.

What is claimed is:

1. An image pickup apparatus comprising:
at least one processor or circuit configured to execute a plurality of tasks including:
a focus detecting task configured to detect a defocus amount by using a signal acquired from an image sensor configured to capture an object image formed by an imaging optical system;
a predicting task configured to calculate information corresponding to a predicted image plane position, which is an image plane position of the object image at a future time, by performing a prediction calculation using the defocus amount detected a plurality of times and position data of a focusing element and time data when the defocus amount is detected; and
a controlling task configured to calculate a driving amount of the focusing element using the information corresponding to the predicted image plane position, to calculate a driving velocity for the focusing element according to the driving amount, and to provide a control such that the focusing element is driven at the driving velocity,
wherein the controlling task calculates the driving velocity in order that an image plane position of the imaging optical system approaches the predicted image plane position.

2. The image pickup apparatus according to claim 1, wherein when a change velocity of the image plane position of the object image calculated using the defocus amount is lower than a predetermined change velocity, the predicting task calculates the information corresponding to the predicted image plane position by using the defocus amount without performing the prediction calculation.

3. The image pickup apparatus according to claim 1, wherein when the information corresponding to the predicted image plane position cannot be calculated by the prediction calculation, the controlling task calculates the information corresponding to the predicted image plane position by using the defocus amount without performing the prediction calculation.

4. The image pickup apparatus according to claim 1, wherein the controlling task calculates the information corresponding to the predicted image plane position by using the defocus amount without performing the prediction calculation during zooming of the imaging optical system.

5. The image pickup apparatus according to claim 1, wherein the controlling task switches between controlling both the driving amount and the driving velocity of the focusing element, and controlling only the driving velocity of the focusing element.

6. The image pickup apparatus according to claim 4, wherein when an object moves at a constant velocity, the controlling task controls only the driving velocity of the focusing element.

7. The image pickup apparatus according to claim 1, wherein the controlling task calculates the driving velocity by using the driving amount and a time length for driving the focusing element.

8. The image pickup apparatus according to claim 1, wherein the controlling task detects the defocus amount at a plurality of detection timings, and
wherein the controlling task controls the driving velocity of the focusing element by using the information corresponding to the predicted image plane position calculated between the detection timings.

9. The image pickup apparatus according to claim 1, wherein during motion image capturing, the controlling task differently controls driving of the focusing element from during still image capturing.

10. The image pickup apparatus according to claim 9, wherein during the motion image capturing, the controlling task calculates the driving velocity lower than that during the still image capturing.

11. The image pickup apparatus according to claim 1, wherein the controlling task calculates a first driving amount by using the information corresponding to the predicted image plane position, and sets a second driving amount, which is larger than the first driving amount, as the driving amount for driving the focusing element.

12. The image pickup apparatus according to claim 11, wherein the controlling task selects the first driving amount or the second driving amount for controlling driving of the focusing element.

13. The image pickup apparatus according to claim 12, wherein when the driving velocity is lower than a predetermined driving velocity, the controlling task selects the first driving amount, and
wherein when the driving velocity is higher than the predetermined driving velocity, the controlling task selects the second driving amount.

14. The image pickup apparatus according to claim 11, wherein when the change velocity of the predicted image plane position decreases, the controlling task selects the second driving amount.

15. The image pickup apparatus according to claim 11, wherein the predicting task calculates information corresponding to a first predicted image plane position at a first time as the predicted image plane position, and calculates information corresponding to a second predicted image plane position at a second time after the first time, and
wherein the controlling task calculates the second driving amount by using the information corresponding to the second predicted image plane position.

16. The image pickup apparatus according to claim 1, wherein when an object is a moving body, the controlling task performs first control for controlling driving of the focusing element by calculating the driving velocity so that the image plane position of the imaging optical system approaches the predicted image plane position, and
wherein when the object is not the moving body, the controlling task performs second control for controlling the driving of the focusing element at a lower velocity than that of the first control, by using the defocus amount.

17. The image pickup apparatus according to claim 16, wherein when switching from the second control to the first control, the controlling task calculates the driving velocity so that the image plane position of the imaging optical system in a frame a plurality of frames after approaches the predicted image plane position.

18. The image pickup apparatus according to claim 16,
wherein when an object distance is longer than a predetermined distance, the controlling task performs a moving body determination on the object using a first sensitivity, and
wherein when the object distance is shorter than the predetermined distance, the controlling task performs the moving body determination on the object using a second sensitivity higher than the first sensitivity.

19. The image pickup apparatus according to claim 16, wherein the controlling task performs the second control when determining that a user switched the object to be targeted for focusing control.

20. The image pickup apparatus according to claim 19, wherein the controlling task determines that the object has been switched when detecting panning based on a shake amount of the image pickup apparatus.

21. The image pickup apparatus according to claim 20, wherein the controlling task does not determine that the object has been switched when determining that the object is a moving body even when detecting the panning.

22. The image pickup apparatus according to claim 20, comprising
at least one processor or circuit configured to execute a task of:
an object detecting task configured to detect information on brightness of the object by using a signal acquired from the image sensor,
wherein the controlling task does not determine that the object has been switched when determining that the same object is targeted for the focusing control based on the information on the brightness of the object even when detecting the panning.

23. The image pickup apparatus according to claim 22, wherein the information on the brightness of the object is at least one of information on a color of the object and information on a face area of the object.

24. The image pickup apparatus according to claim 19, wherein the controlling task deletes data relating to the defocus amount detected a plurality of times in past in order to determine that the object is not the moving body when determining that the object has been switched.

25. The image pickup apparatus according to claim 16, wherein the controlling task performs the second control when determining that a perspective conflict occurs between a plurality of objects.

26. The image pickup apparatus according to claim 25, wherein the controlling task determines that the perspective conflict does not occur when a predetermined condition is satisfied during a determination for the perspective conflict.

27. The image pickup apparatus according to claim 26, wherein the predetermined condition is that the defocus amount detected by the focus detecting task is smaller than a predetermined value.

28. The image pickup apparatus according to claim 26, wherein the predetermined condition is that focus detection is performed based on face information detected by an object detecting task.

29. The image pickup apparatus according to claim 26, wherein the predetermined condition is that focus detection is performed based on pupil information detected by an object detecting task.

30. The image pickup apparatus according to claim 16, wherein the controlling task performs, when a predetermined condition is satisfied, third control that is different from the first control and the second control.

31. The image pickup apparatus according to claim 30, wherein the third control stops the driving of the focusing element.

32. The image pickup apparatus according to claim 30, wherein the predetermined condition is that the defocus amount detected by the focus detecting task is larger than a predetermined value.

33. The image pickup apparatus according to claim 32, wherein the controlling task sets the predetermined value to a first predetermined value when the object is the moving body and a change velocity of the image plane position of the object image calculated using the defocus amount is not higher than a predetermined change velocity, and sets the predetermined value to a second predetermined value, which is different from the first predetermined value, when the object is the moving body and the change velocity of the image plane position is higher than the predetermined change velocity.

34. The image pickup apparatus according to claim 33, wherein the second predetermined value is larger than the first predetermined value.

35. The image pickup apparatus according to claim 1, wherein when an object is not a moving body or during motion image capturing, the controlling task keep driving the focusing element without stopping it.

36. A control method for an image pickup apparatus comprising steps of:
detecting a defocus amount by using a signal acquired from an image sensor configured to capture an object image formed by an imaging optical system;
calculating information corresponding to a predicted image plane position, which is an image plane position of the object image at a future time, by performing a prediction calculation using the defocus amount detected a plurality of times and position data of a focusing element and time data when the defocus amount is detected; and
calculating a driving amount of the focusing element using the information corresponding to the predicted image plane position, calculating a driving velocity for the focusing element according to the driving amount, and providing a control such that the focusing element is driven at the driving velocity,
wherein the driving velocity is calculated in order that an image plane position of the imaging optical system approaches the predicted image plane position.

37. A non-transitory computer-readable storage medium storing a computer program that causes a computer to execute a control method for an image pickup apparatus comprising steps of:
detecting a defocus amount by using a signal acquired from an image sensor configured to capture an object image formed by an imaging optical system;
calculating information corresponding to a predicted image plane position, which is an image plane position of the object image at a future time, by performing a prediction calculation using the defocus amount detected a plurality of times and position data of a focusing element and time data when the defocus amount is detected; and
calculating a driving amount of the focusing element using the information corresponding to the predicted image plane position, calculating a driving velocity for the focusing element according to the driving amount,
and providing a control such that the focusing element
is driven at the driving velocity,
wherein the driving velocity is calculated in order that an
image plane position of the imaging optical system
approaches the predicted image plane position.

\* \* \* \* \*